United States Patent
Omori et al.

(10) Patent No.: US 7,317,903 B2
(45) Date of Patent: Jan. 8, 2008

(54) WIRELESS COMMUNICATION CIRCUIT, WIRELESS COMMUNICATION APPARATUS, AND WIRELESS COMMUNICATION SYSTEM

(75) Inventors: Manabu Omori, Osaka (JP); Jiro Nakabayashi, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 374 days.

(21) Appl. No.: 10/923,607

(22) Filed: Aug. 23, 2004

(65) Prior Publication Data

US 2005/0079825 A1   Apr. 14, 2005

Related U.S. Application Data

(60) Provisional application No. 60/587,029, filed on Jul. 13, 2004.

(30) Foreign Application Priority Data

Sep. 30, 2003 (JP) .............................. 2003-341573
Jul. 13, 2004 (JP) .............................. 2004-206494

(51) Int. Cl.
*H04B 1/04* (2006.01)
*H01Q 7/12* (2006.01)

(52) U.S. Cl. ................. 455/127.3; 455/127.1
(58) Field of Classification Search ............ 455/127.1, 455/127.3, 522, 67.11, 69
See application file for complete search history.

(56) References Cited

U.S. PATENT DOCUMENTS

| | | | |
|---|---|---|---|
| 5,722,061 A * | 2/1998 | Hutchison et al. ....... | 455/245.1 |
| 5,797,090 A | 8/1998 | Nakamura ............... | 455/234.1 |
| 5,909,643 A | 6/1999 | Aihara | |
| 6,052,572 A * | 4/2000 | Imura ..................... | 455/343.5 |
| 6,288,608 B1 | 9/2001 | Jadus et al. | |
| 6,397,090 B1* | 5/2002 | Cho ........................ | 455/574 |
| 6,591,087 B1 | 7/2003 | Oda ........................ | 455/78 |
| 7,003,272 B1* | 2/2006 | Mader et al. .............. | 455/254 |
| 2001/0006428 A1 | 7/2001 | Mizuno .................... | 359/172 |
| 2002/0028700 A1* | 3/2002 | Kato ........................ | 455/572 |
| 2002/0094840 A1 | 7/2002 | Hattori et al. | |
| 2003/0012128 A1 | 1/2003 | Miyoshi et al. ............ | 370/208 |
| 2004/0005007 A1* | 1/2004 | Viscito et al. ........ | 375/240.25 |
| 2004/0019717 A1* | 1/2004 | Kondo et al. .............. | 710/100 |
| 2004/0199683 A1* | 10/2004 | Asmuth ..................... | 710/52 |

FOREIGN PATENT DOCUMENTS

EP          0 847 135        6/1998

(Continued)

OTHER PUBLICATIONS

Taiwanese Office Action dated Aug. 29, 2005 in patent application 093129639 and English translation thereof.

*Primary Examiner*—Lewis West
(74) *Attorney, Agent, or Firm*—Nixon & Vanderhye, PC

(57) ABSTRACT

A wireless communication circuit in accordance with the present invention, is the wireless communication circuit having an amplifier for amplifying a signal, includes an amplification route in which the signal passes through the amplifier; a bypass route for bypassing the amplifier; and a route-selector for selecting one of the amplification route and the bypass route. This arrangement prevents an amplification of a signal, being transmitted or being received, when a communication counterpart is in a close distance, thereby reducing an unnecessary power consumption.

54 Claims, 22 Drawing Sheets

FOREIGN PATENT DOCUMENTS

| | | |
|---|---|---|
| EP | 1 026 906 | 8/2000 |
| JP | 61-059917 | 3/1986 |
| JP | 4-116440 U | 10/1992 |
| JP | 07-050599 | 2/1995 |
| JP | 10-028066 | 1/1998 |
| JP | 11-103259 | 4/1999 |
| JP | 3093705 B2 | 7/2000 |
| JP | 2001-320286 * | 11/2001 |
| JP | 2004-96422 A | 3/2004 |

* cited by examiner

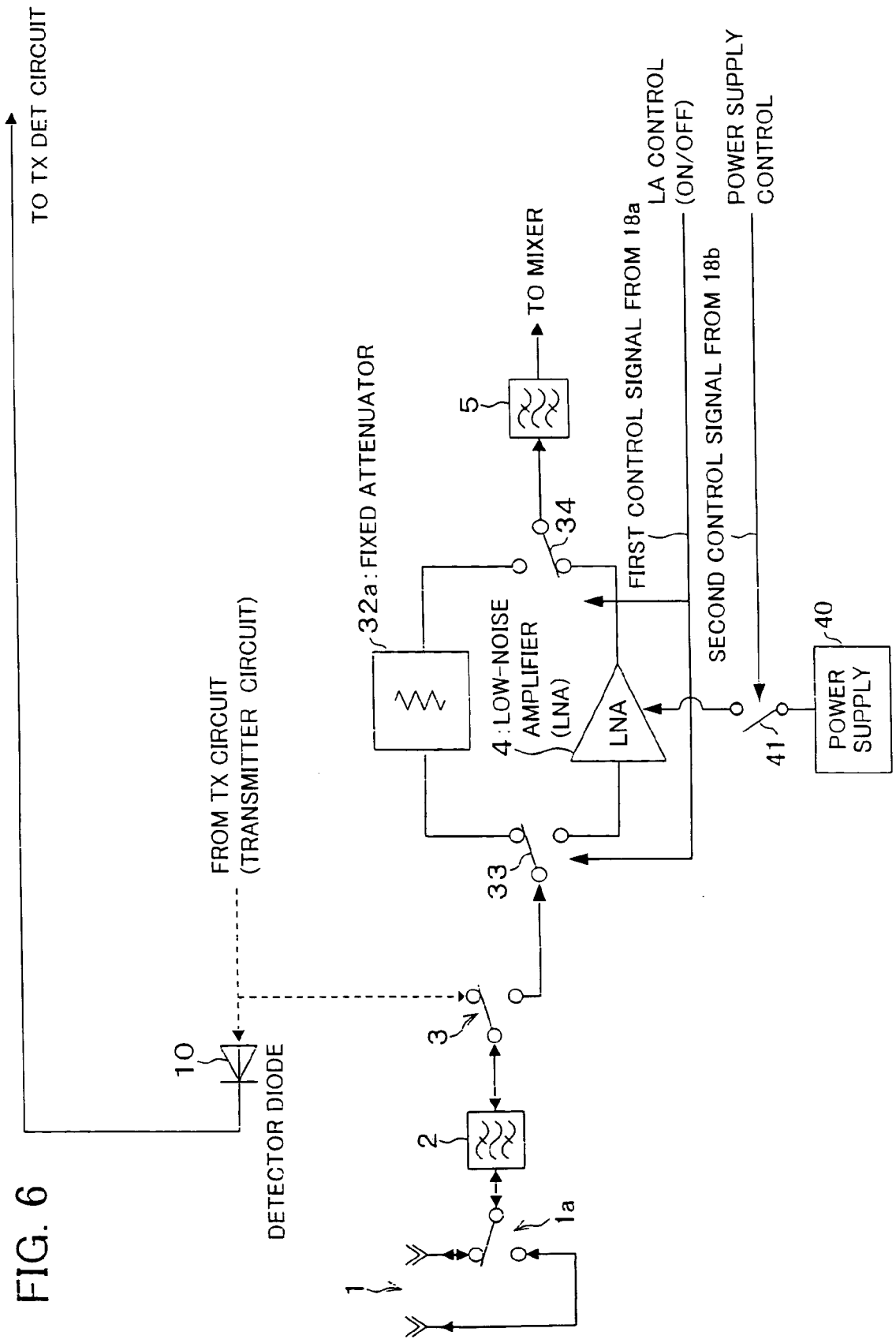

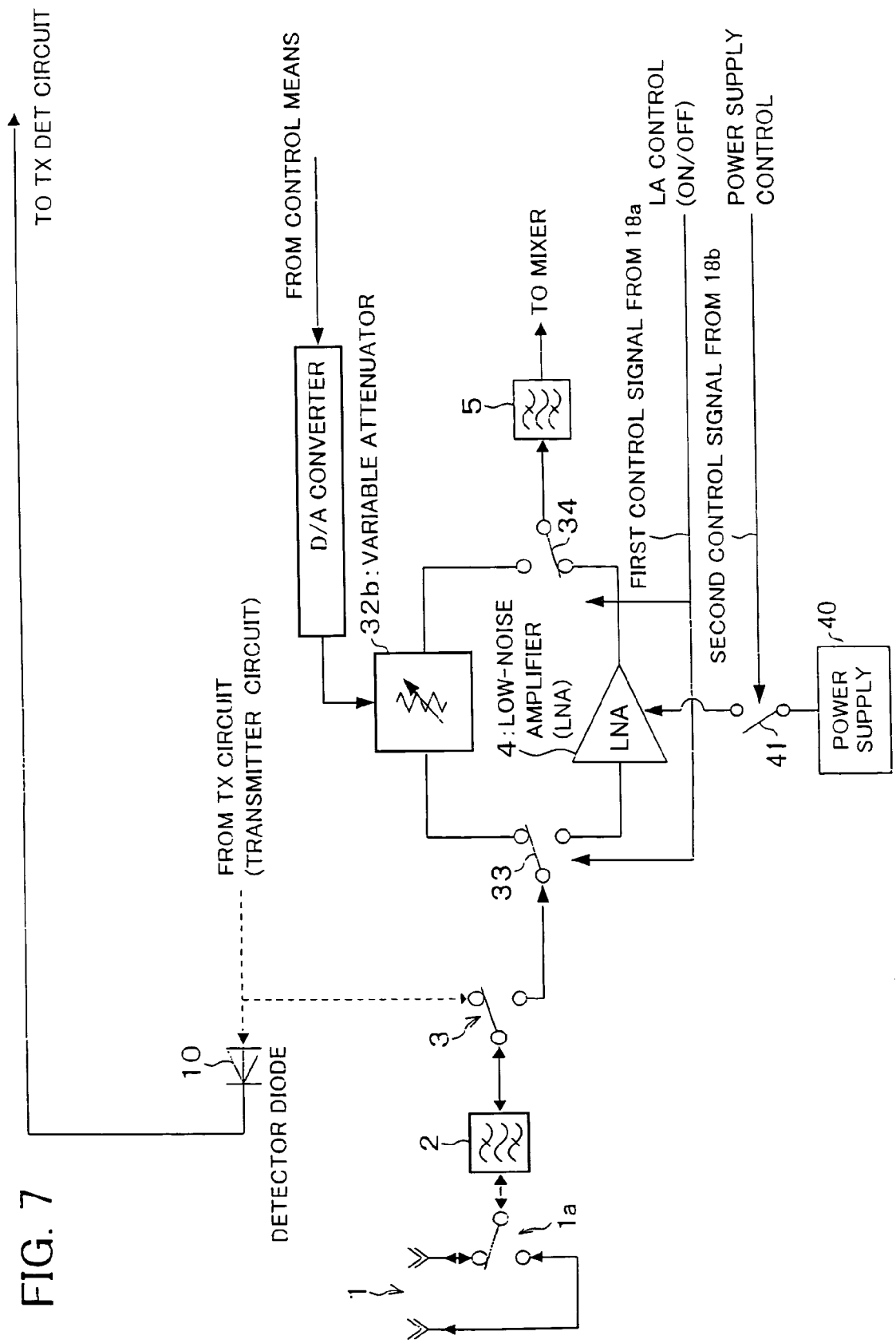

\*\*\* CASE OF USING POWER AMPLIFIER FOR TRANSMISSION \*\*\*

\*\*\* CASE OF NOT USING POWER AMPLIFIER FOR TRANSMISSION \*\*\*
(CASE OF USING BYPASS ROUTE)

FIG. 8(a)
CASE OF 2ND POWER LAW

| | | | Low CH | Mid CH | High CH |
|---|---|---|---|---|---|
| FREQUENCY | F* | [GHz] | 2.412 | 2.442 | 2.472 |
| WAVELENGTH | λ | [m] | 0.124378 | 0.12285 | 0.121359 |
| GAIN OF TRANSMITTING ANTENNA | Gt* | [dBi] | -2 | -2 | -2 |
| GAIN OF RECEIVING ANTENNA | Gr* | [dBi] | -2 | -2 | -2 |
| TRANSMISSION POWER | Pt* | [dBm] | 15 | 15 | 15 |
| RECEPTION POWER (RECEPTION SENSITIVITY) | Pr* | [dBm] | -90 | -90 | -90 |
| DISTANCE | d | [m] | 1110.5 | 1096.9 | 1083.6 |

FIG. 8(b)
CASE OF 2.5TH POWER LAW

| | | | Low CH | Mid CH | High CH |
|---|---|---|---|---|---|
| FREQUENCY | F* | [GHz] | 2.412 | 2.442 | 2.472 |
| WAVELENGTH | λ | [m] | 0.124378 | 0.12285 | 0.121359 |
| GAIN OF TRANSMITTING ANTENNA | Gt* | [dBi] | -2 | -2 | -2 |
| GAIN OF RECEIVING ANTENNA | Gr* | [dBi] | -2 | -2 | -2 |
| TRANSMISSION POWER | Pt* | [dBm] | 15 | 15 | 15 |
| RECEPTION POWER (RECEPTION SENSITIVITY) | Pr* | [dBm] | -90 | -90 | -90 |
| DISTANCE | d | [m] | 108.5 | 107.2 | 105.9 |

FIG. 8(c)
CASE OF 3RD POWER LAW

| | | | Low CH | Mid CH | High CH |
|---|---|---|---|---|---|
| FREQUENCY | F* | [GHz] | 2.412 | 2.442 | 2.472 |
| WAVELENGTH | λ | [m] | 0.124378 | 0.12285 | 0.121359 |
| GAIN OF TRANSMITTING ANTENNA | Gt* | [dBi] | -2 | -2 | -2 |
| GAIN OF RECEIVING ANTENNA | Gr* | [dBi] | -2 | -2 | -2 |
| TRANSMISSION POWER | Pt* | [dBm] | 15 | 15 | 15 |
| RECEPTION POWER (RECEPTION SENSITIVITY) | Pr* | [dBm] | -90 | -90 | -90 |
| DISTANCE | d | [m] | 23.0 | 22.7 | 22.5 |

FIG. 8(d)
CASE OF 2ND POWER LAW

| | | | Low CH | Mid CH | High CH |
|---|---|---|---|---|---|
| FREQUENCY | F* | [GHz] | 2.412 | 2.442 | 2.472 |
| WAVELENGTH | λ | [m] | 0.124378 | 0.12285 | 0.121359 |
| GAIN OF TRANSMITTING ANTENNA | Gt* | [dBi] | -2 | -2 | -2 |
| GAIN OF RECEIVING ANTENNA | Gr* | [dBi] | -2 | -2 | -2 |
| TRANSMISSION POWER | Pt* | [dBm] | 0 | 0 | 0 |
| RECEPTION POWER (RECEPTION SENSITIVITY) | Pr* | [dBm] | -90 | -90 | -90 |
| DISTANCE | d | [m] | 197.5 | 195.1 | 192.7 |

FIG. 8(e)
CASE OF 2.5TH POWER LAW

| | | | Low CH | Mid CH | High CH |
|---|---|---|---|---|---|
| FREQUENCY | F* | [GHz] | 2.412 | 2.442 | 2.472 |
| WAVELENGTH | λ | [m] | 0.124378 | 0.12285 | 0.121359 |
| GAIN OF TRANSMITTING ANTENNA | Gt* | [dBi] | -2 | -2 | -2 |
| GAIN OF RECEIVING ANTENNA | Gr* | [dBi] | -2 | -2 | -2 |
| TRANSMISSION POWER | Pt* | [dBm] | 0 | 0 | 0 |
| RECEPTION POWER (RECEPTION SENSITIVITY) | Pr* | [dBm] | -90 | -90 | -90 |
| DISTANCE | d | [m] | 27.3 | 26.9 | 26.6 |

FIG. 8(f)
CASE OF 3RD POWER LAW

| | | | Low CH | Mid CH | High CH |
|---|---|---|---|---|---|
| FREQUENCY | F* | [GHz] | 2.412 | 2.442 | 2.472 |
| WAVELENGTH | λ | [m] | 0.124378 | 0.12285 | 0.121359 |
| GAIN OF TRANSMITTING ANTENNA | Gt* | [dBi] | -2 | -2 | -2 |
| GAIN OF RECEIVING ANTENNA | Gr* | [dBi] | -2 | -2 | -2 |
| TRANSMISSION POWER | Pt* | [dBm] | 0 | 0 | 0 |
| RECEPTION POWER (RECEPTION SENSITIVITY) | Pr* | [dBm] | -90 | -90 | -90 |
| DISTANCE | d | [m] | 7.3 | 7.2 | 7.1 |

* CASE OF USING LOW-NOISE AMPLIFIER FOR RECEPTION *

FIG. 9(a)
CASE OF 2ND POWER LAW

| | | | Low CH | Mid CH | High CH |
|---|---|---|---|---|---|
| FREQUENCY | F* | [GHz] | 2.412 | 2.442 | 2.472 |
| WAVELENGTH | λ | [m] | 0.124378 | 0.12285 | 0.121359 |
| GAIN OF TRANSMITTING ANTENNA | Gt* | [dBi] | -2 | -2 | -2 |
| GAIN OF RECEIVING ANTENNA | Gr* | [dBi] | -2 | -2 | -2 |
| TRANSMISSION POWER | Pt* | [dBm] | 15 | 15 | 15 |
| RECEPTION POWER (RECEPTION SENSITIVITY) | Pr* | [dBm] | -90 | -90 | -90 |
| DISTANCE | d | [m] | 1110.5 | 1096.9 | 1083.6 |

FIG. 9(b)
CASE OF 2.5TH POWER LAW

| | | | Low CH | Mid CH | High CH |
|---|---|---|---|---|---|
| FREQUENCY | F* | [GHz] | 2.412 | 2.442 | 2.472 |
| WAVELENGTH | λ | [m] | 0.124378 | 0.12285 | 0.121359 |
| GAIN OF TRANSMITTING ANTENNA | Gt* | [dBi] | -2 | -2 | -2 |
| GAIN OF RECEIVING ANTENNA | Gr* | [dBi] | -2 | -2 | -2 |
| TRANSMISSION POWER | Pt* | [dBm] | 15 | 15 | 15 |
| RECEPTION POWER (RECEPTION SENSITIVITY) | Pr* | [dBm] | -90 | -90 | -90 |
| DISTANCE | d | [m] | 108.5 | 107.2 | 105.9 |

FIG. 9(c)
CASE OF 3RD POWER LAW

| | | | Low CH | Mid CH | High CH |
|---|---|---|---|---|---|
| FREQUENCY | F* | [GHz] | 2.412 | 2.442 | 2.472 |
| WAVELENGTH | λ | [m] | 0.124378 | 0.12285 | 0.121359 |
| GAIN OF TRANSMITTING ANTENNA | Gt* | [dBi] | -2 | -2 | -2 |
| GAIN OF RECEIVING ANTENNA | Gr* | [dBi] | -2 | -2 | -2 |
| TRANSMISSION POWER | Pt* | [dBm] | 15 | 15 | 15 |
| RECEPTION POWER (RECEPTION SENSITIVITY) | Pr* | [dBm] | -90 | -90 | -90 |
| DISTANCE | d | [m] | 23.0 | 22.7 | 22.5 |

* CASE OF NOT USING LOW-NOISE AMPLIFIER FOR RECEPTION *
(CASE OF USING BYPASS ROUTE)

FIG. 9(d)
CASE OF 2ND POWER LAW

| | | | Low CH | Mid CH | High CH |
|---|---|---|---|---|---|
| FREQUENCY | F* | [GHz] | 2.412 | 2.442 | 2.472 |
| WAVELENGTH | λ | [m] | 0.124378 | 0.12285 | 0.121359 |
| GAIN OF TRANSMITTING ANTENNA | Gt* | [dBi] | -2 | -2 | -2 |
| GAIN OF RECEIVING ANTENNA | Gr* | [dBi] | -2 | -2 | -2 |
| TRANSMISSION POWER | Pt* | [dBm] | 15 | 15 | 15 |
| RECEPTION POWER (RECEPTION SENSITIVITY) | Pr* | [dBm] | -80 | -80 | -80 |
| DISTANCE | d | [m] | 351.2 | 346.9 | 342.7 |

FIG. 9(e)
CASE OF 2.5TH POWER LAW

| | | | Low CH | Mid CH | High CH |
|---|---|---|---|---|---|
| FREQUENCY | F* | [GHz] | 2.412 | 2.442 | 2.472 |
| WAVELENGTH | λ | [m] | 0.124378 | 0.12285 | 0.121359 |
| GAIN OF TRANSMITTING ANTENNA | Gt* | [dBi] | -2 | -2 | -2 |
| GAIN OF RECEIVING ANTENNA | Gr* | [dBi] | -2 | -2 | -2 |
| TRANSMISSION POWER | Pt* | [dBm] | 15 | 15 | 15 |
| RECEPTION POWER (RECEPTION SENSITIVITY) | Pr* | [dBm] | -80 | -80 | -80 |
| DISTANCE | d | [m] | 43.2 | 42.7 | 42.2 |

FIG. 9(f)
CASE OF 3RD POWER LAW

| | | | Low CH | Mid CH | High CH |
|---|---|---|---|---|---|
| FREQUENCY | F* | [GHz] | 2.412 | 2.442 | 2.472 |
| WAVELENGTH | λ | [m] | 0.124378 | 0.12285 | 0.121359 |
| GAIN OF TRANSMITTING ANTENNA | Gt* | [dBi] | -2 | -2 | -2 |
| GAIN OF RECEIVING ANTENNA | Gr* | [dBi] | -2 | -2 | -2 |
| TRANSMISSION POWER | Pt* | [dBm] | 15 | 15 | 15 |
| RECEPTION POWER (RECEPTION SENSITIVITY) | Pr* | [dBm] | -80 | -80 | -80 |
| DISTANCE | d | [m] | 10.7 | 10.6 | 10.4 |

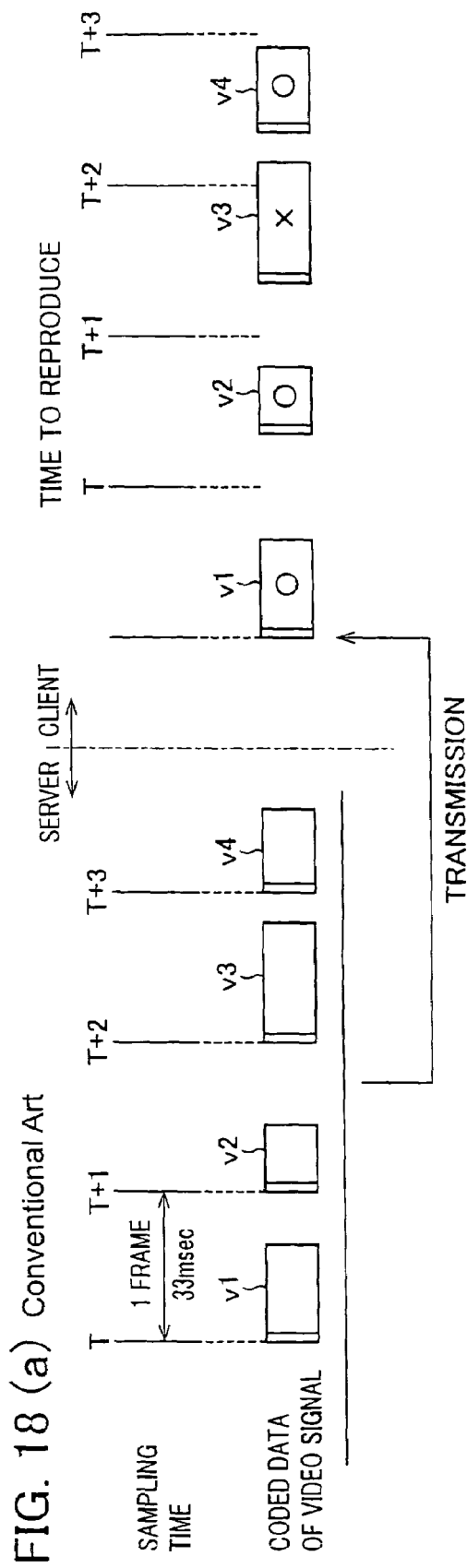
FIG. 18 (a) Conventional Art
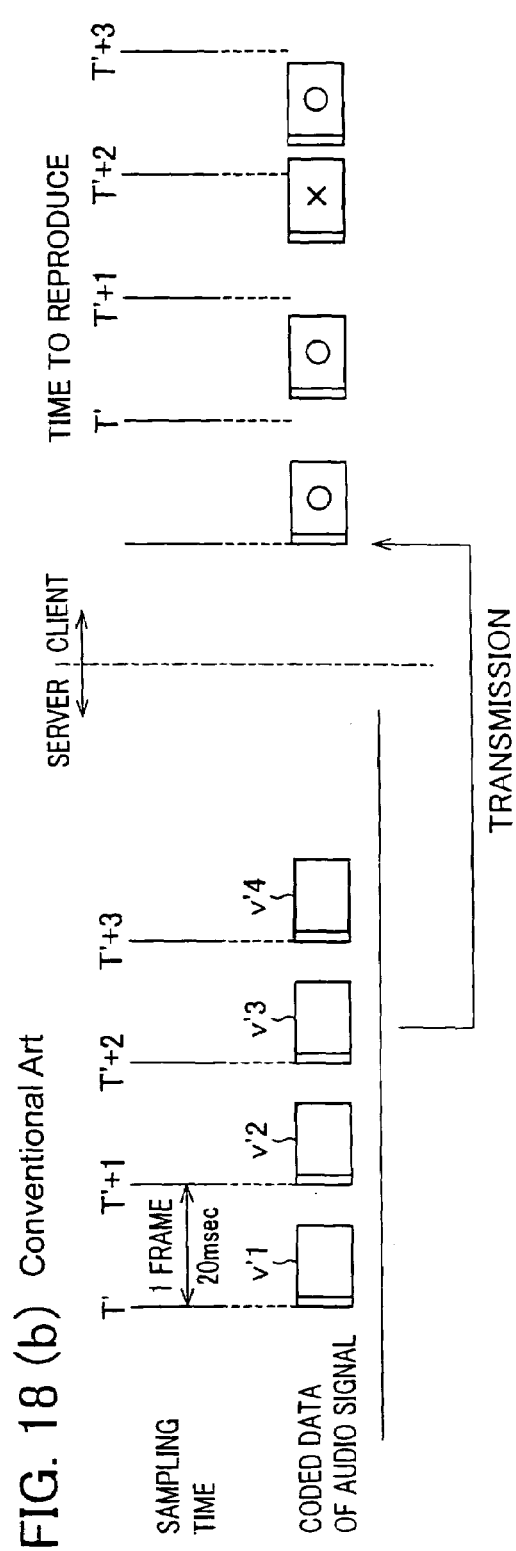
FIG. 18 (b) Conventional Art

WIRELESS COMMUNICATION CIRCUIT, WIRELESS COMMUNICATION APPARATUS, AND WIRELESS COMMUNICATION SYSTEM

This nonprovisional application claims the benefit of U.S. Provisional Application Ser. No. 60/587,029 filed on Jul. 13, 2004, and claims priority under 35 U.S.C. § 119(a) on Patent Application No. 2003-341573 filed in Japan on Sep. 30, 2003, and Patent Application No. 2004-206494 filed in Japan on Jul. 13, 2004, the entire contents of all of which are hereby incorporated by reference.

FIELD OF THE INVENTION

This invention relates to a wireless communication circuit (a circuit for use in wireless communication) suitable for use in a card type wireless communication apparatus having a wireless communication function in which Direct Sequence Spread Spectrum (DSSS) is used, such wireless communication apparatus used by being connected to (a) an information terminal device such as a personal computer, an ADSL (Asymmetric Digital Scriber Line) modem, a wireless access-point, and a wireless router and the like; or (b) a household audio visual equipment such as a TV (television), DVD (Digital Versatile Disc) player, and the like. This invention also relates to a wireless communication apparatus including the same, and a wireless communication system using the same.

BACKGROUND OF THE INVENTION

First, a spread spectrum in a wireless is described below. Usually, a communication using the spread spectrum technology is as follows: a modulated input baseband signal for sound or like is modulated at a transmitting end thereby preparing a modulation signal; the modulation signal is subjected to spectrum spreading by using a spreading code at the transmitting end, thereby preparing a spread spectrum signal; and then the spread spectrum signal is transmitted as a high frequency signal to a receiving end reception-performing communication counterpart), which is a communication counterpart of the transmitting end (transmission-performing communication counterpart). The spread spectrum signal sent from the transmitting end, which is a communication counterpart of the receiving end, and received by the receiving end, is then demodulated (de-spread) at the receiving end, by using the same spreading code used in the transmittance end.

Direct Sequence Spread Spectrum (Hereinafter referred to as "DSSS") and Frequency Hopping Spread Spectrum (Hereinafter referred to as "FHSS") are known as communication methods using the spread spectrum. DSSS spreads a signal over a continuous frequency band, by widely spreading the signal of a narrowband modulation wave by multiplying the signal by using a spreading code. FHSS, such as Bluetooth (registered trademark), spreads a signal within a frequency band by randomly switching over frequencies of a carrier wave within the frequency band in accordance with the diffusion code, the carrier wave being used in communication with the communication counterpart.

The following describes a conventional card type wireless communication apparatus. FIG. 21 is a block circuit diagram showing schematic configuration of the conventional card type wireless communication apparatus. The conventional card type wireless communication apparatus 50 shown in FIG. 21 is so configured that an antenna 51 is connected to a receiver circuit 52, and to a transmitter circuit 57.

The receiver circuit 52 includes an amplifier 53, a mixer circuit 54, and a demodulator circuit 55. The antenna 51 is connected to a baseband signal processing circuit 61 through the amplifier 53, the mixer circuit 54 and the demodulator circuit 55.

The transmitter circuit 57 includes a modulator 60, a mixer circuit 59, and an amplifier 58. The baseband signal processing circuit 61 is connected to the antenna 51 through the modulator 60, the mixer circuit 59, and the amplifier 58. The mixer circuit 54 and the mixer circuit 59 are connected to a local oscillator 56.

Further, the baseband signal processing circuit 61 is connected to a connector 65 through an interface circuit 62, and the receiver circuit 52, the transmitter circuit 57, and the baseband signal processing circuit 61 are connected to a circuit control section 63. A power supply 64 is connected to the connector 65 and each of the above-described circuits in the card type wireless communication apparatus 50.

Next described is operation of the conventional card type wireless communication apparatus 50 shown in FIG. 21. A spread spectrum signal (e.g. 2.4 GHz-band) from the communication counterpart (that is, the transmitting end) is received by the antenna 51 of the receiving end. Then, in the receiving end, the spread spectrum signal is amplified by the amplifier 53, and is applied to the mixer circuit 54. The spread spectrum signal, which is the thus received high frequency signal, is demodulated to a baseband signal by the mixer circuit 54 and the demodulator circuit 55. The baseband signal then undergoes a necessary signal processing conducted by the baseband signal processing circuit 61, and is output through the interface circuit 62 and the connector 65 to an information terminal device (not shown), such as a personal computer (PC) or the like.

At the transmitting end, a data signal being inputted from the information terminal device (not shown) through the connector 65 and the interface circuit 62 undergoes the necessary signal processing conducted by the baseband signal processing circuit 61, and is spread to a spread spectrum signal (e.g. 2.4 GHz-band) by the modulator 60 and the mixer circuit 59. The data signal is then amplified by the amplifier 58, and is transmitted via the antenna 51 to the communication counterpart (that is, the transmitting end).

The circuit-control section 63 controls the operation of the receiver circuit 52, the transmitter circuit 57, and the baseband signal processing circuit 61. The power supply 64 receives power through the connector 65 from the information terminal device (not shown) such as a PC or the like, and supplies power+B to each circuit described above in the card type wireless communication apparatus 50.

The local oscillator 56 generates necessary frequency signals (e.g. 2.4 GHz) for the operation of each of the mixer circuits 54 and 59.

For controlling an RF signal of a wireless section, different types of communication apparatuses modulate and demodulate signals of different frequencies and levels after converting the frequencies of the signals. Therefore, it is necessary to have a stable modulation and demodulation characteristics.

Here, one of most important factors is an input dynamic range. The input dynamic range indicates a range of a weakest input signal to an input strongest signal that can be stably received and demodulated.

For the wireless communication apparatus having the receiver and transmitter circuits, the dynamic range is determined mainly by parameters such as transmission (high frequency) power, reception sensitivity, and a distortion property.

There has been desire for a larger communication range. For a short distance communication (in which a distance between a host and a client is short), one of conventional arts for attaining a large communication range is to prevent deterioration in distortion property with respect to a strong incoming signal by using an attenuator in an input stage of a receiver device, or by lowering a gain of a low-noise amplifier or an IF amplifier (see Reference 1: Japanese Publication of Utility Model, Jitsukaihei, No. 4-116440 (published on Oct. 29, 1992))

FIG. 22 shows an example of the conventional art. In FIG. 22, an attenuator circuit (RF ATT) 90 is provided in between a high frequency signal input terminal 71 and a high frequency amplifier 78. The attenuator circuit (RF ATT) 90 includes PIN diodes 91, 92, and 93. The PIN diodes 91, 92, and 93 can be used at RF-band.

In this example, the PIN diodes 91, 92, and 93 arranged in π-shape are (turned ON and OFF in accordance with a switching signal from a terminal 77 depending on whether the high frequency signal is strong or weak. Thereby, the PIN diodes 91, 92, and 93 perform high frequency attenuation when turned ON, whereas the PIN diodes 91, 92, and 93 are in a "through" state when turned OFF.

Note that in FIG. 22, there are provided a high frequency bandpass filter (RFBPF) 79, a mixer (MIXER) 80, a first voltage-controlled oscillator (VCD1) 81, a first IF amplifier (IFAMP) 82, an IF bandpass filter 83, a second IF amplifier 84, an FM detector (FMDET) 85, a second voltage controlling oscillator 86, and an output terminal 87 for outputting a detected signal. Descriptions for these circuits are omitted, as they are well-known circuits. Further, in some cases, the attenuator circuit 90 in FIG. 22 is provided in between the high frequency amplifier 78 and the RFBPF 79 or the mixer 80.

In the conventional art shown in FIG. 21, the power is supplied to the power supply 64 of the card type wireless communication apparatus 50 through the connector 65 from the information terminal device (not shown) such as a PC or the like. There will not be any problems as long as the information terminal device such as a PC or the like operates with power from a commercial power source.

However, when the information terminal device such as a PC or the like operates in order to use the information terminal device such a PC or the like in a mobile manner), the information terminal device is operated with power supplied from a battery mounted in a main body of the information terminal device. Accordingly, the power supply 64 of the card type wireless communication apparatus 50 is supplied, through the connector 65, with the power from the battery mounted in the main body of the information terminal device such as a PC or the like.

Namely, an increase in the power consumption in the card type wireless communication apparatus 50 causes a faster consumption of the battery mounted in the main body of the information terminal device. This shortens a time period (duration of battery) in which the information terminal device can be used without the commercial power source.

SUMMARY OF THE INVENTION

In view of the foregoing problems, an object of the present invention is to provide a wireless communication circuit that allows both (a) an apparatus in which the circuit is provided, and (b) a counter apparatus (communication counterpart), to perform high-quality communication with low power consumption, or to provide a card type wireless communication circuit in which a power consumption can be reduced by independently controlling supplying and stopping actions of power to the respective circuits of the card type wireless communication apparatus, based on a level of a received high frequency signal.

In order to achieve the foregoing object, a wireless communication circuit of the present invention, which includes an amplifier for amplifying a signal, is so arranged as to include: an amplification route in which the signal passes through the amplifier; a bypass route for bypassing the amplifier; and a route-selector for selecting one of the amplification route and the bypass route.

With this arrangement, it is possible to select the route passing the amplifier or the bypass route, according to needs. For example, a bypass route is selected when strength of the signal received is strong enough, because a communication counterpart is located in a close distance, whereas the route passing the amplifier is selected when the strength of the signal received is not strong enough, because the communication counterpart is located in a far distance.

In other words, a power is consumer for driving the amplifier when selecting the route passing the amplifier, because the signal passes the amplifier. However, when the bypass route, bypassing the amplifier, is selected; the power is saved, because the amplifier does not have to be driven.

This arrangement avoids unnecessary amplification of a signal that is to be transmitted to a communication counter part in a close distance or a signal received from the communication counterpart in the close distance, thereby reducing unnecessary power consumption.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 6 is a block diagram of the card type wireless communication circuit of yet still another embodiment according to the present invention, showing a specific example of switching-over between a low-noise amplifier for reception, and a fixed attenuator.

FIG. 7 is a block diagram of the card type wireless communication circuit of still yet another embodiment according to the present invention showing a specific example of switching-over between a low-noise amplifier for reception, and a variable attenuator.

FIGS. 8(a) to 8(f) are tables of simulation results, showing a relationship between communication ranges and provision of the power amplifier for transmission.

FIGS. 9(a) to 9(f) are tables of the simulation results, showing a relationship between communication ranges and provision of the low-noise amplifier for reception.

FIG. 18(a) is an explanatory view showing transmission and reception timing of coded data of a video signal.

FIG. 18(b) is an explanatory view showing transmission and reception timing of coded data of an audio signal.

DESCRIPTION OF THE EMBODIMENTS

Embodiments of the present invention will be described below with reference to FIGS. 1 to 10.

The following describes each of the embodiments with reference to the figures.

Figure 1:
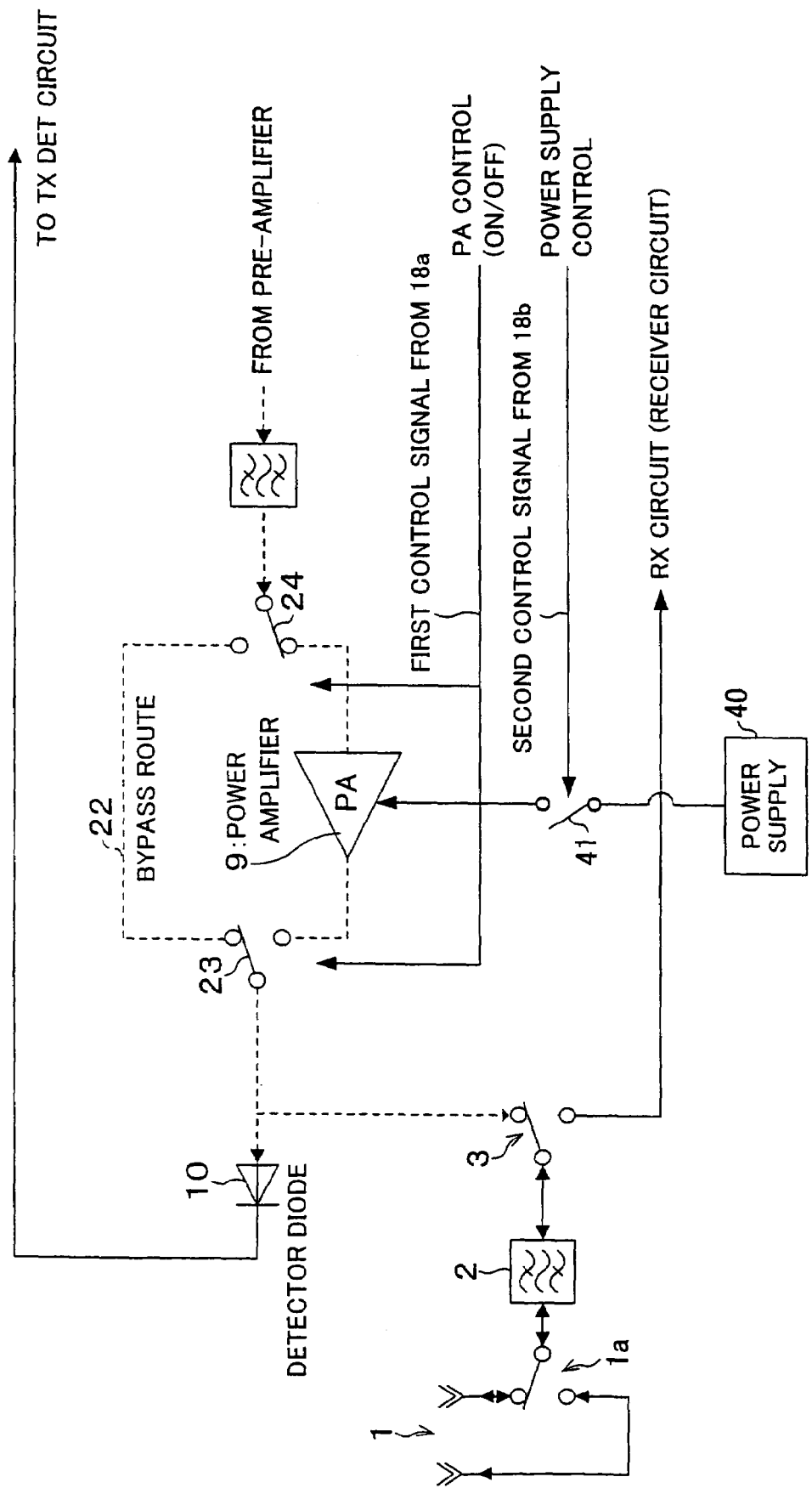
FIG. 1 is a block diagram of a card type wireless communication circuit of an embodiment according to the present invention, showing a specific example of switching-over between a transmission power amplifier and a bypass circuit.
Figure 2:
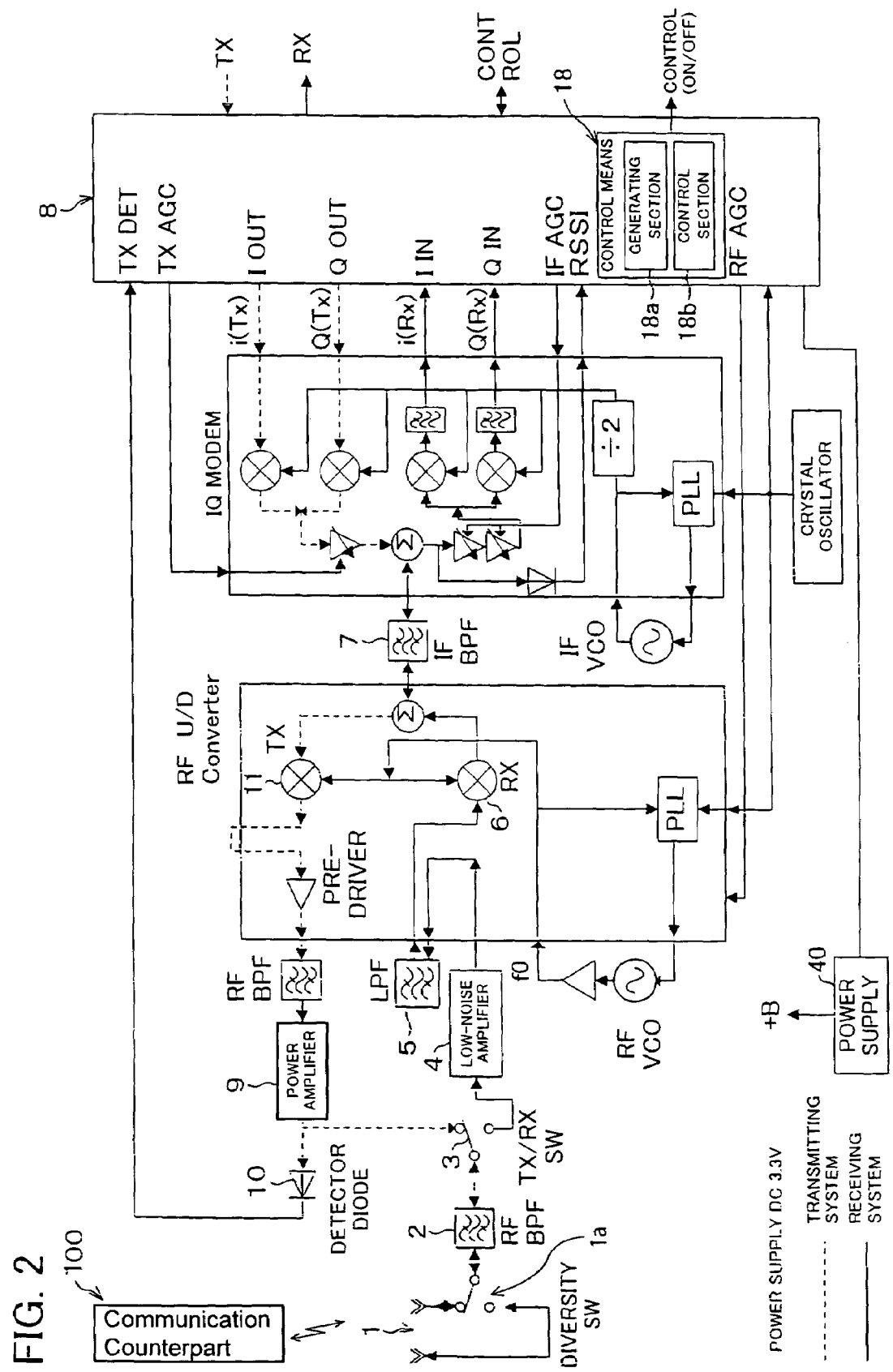
FIG. 2 is a block circuit diagram schematically showing a configuration of a wireless communication apparatus and a wireless communication system that can use wireless communication circuits variously shown in FIGS. 1 and 3-7.

FIG. 2 is a block circuit diagram of a circuit showing a configuration of a card type wireless communication apparatus and a wireless communication system. The wireless communication circuits shown in FIGS. 1 and 3-7 can be used in the wireless communication apparatus shown in FIG. 2. A circuit configuration in the card type wireless communication apparatus from an antenna to a baseband processing LSI, is as follows.

The card type wireless communication apparatus has an antenna 1 for radiation a transmission signal to outside, and for picking up a signal from the outside. The antenna 1 is usually provided with an antenna and a diversity antenna, and is connected to a receiver circuit section (receiving system) and a transmitter circuit section (transmitting system) through a diversity switch (SW) 1a and an RF band pass filter (BPF) 2, the diversity switch for switching the antenna and the diversity antenna.

After the RF band pass filter (BPF) 2 performs attenuation of unnecessary frequency of a signal received by the antenna 1, the receiver circuit section receives the signal (reception signal) during a period in which the transmitting/receiving switch (TX/RXSW) 3 switches to the receiver circuit section. In the receiver circuit section, the reception signal is send to a low-noise amplifier (LNA) 4, by which the signal is amplified. Then the reception signal is subjected to further attenuation by a low pass filter 5 or the like, whereby unnecessary frequency of the reception signal is attenuated. The reception signal is converted (down convert) into an intermediate frequency (IF) by a reception-use mixer 6, which is provided in an RF U/D converter. The reception signal is subjected to band limitation by an IF filter 7, and to IQ demodulation by an IQ modem so as to be demodulated to I-signal and Q-signal. The I-signal and Q-signal are then respectively sent to a baseband processing circuit 8. Note that an RF frequency of the reception signal may be directly down-converted to a baseband frequency, instead of down-converting to the intermediate frequency (IF).

The signal (reproduction signal) thus regenerated by signal processing in the baseband processing circuit 8 is outputted from the baseband processing circuit 8 to an information terminal device, such as a personal computer, a PDA or the like, in a form suitable for a type of interface circuit: PCMCIA (for card bus of 16-bit or 32-bit) for a PC card, USB1.1 or USB2.0 for a USB adaptor SDIO for a SD card, and so on. For an information terminal device in which the interface circuit is built in, a PCI bus or the like is used for supplying the regenerated signal.

On the other hand, in the transmitter circuit, a data input signal in the form suitable for the type of interface circuit (such as later-described PCMCIA, USB or SDIO) is inputted into the baseband processing circuit 8 from the information terminal device such as the personal computer, the PDA (Personal Digital Assistance) or the like. Then the data input signal is subjected to the signal process by the baseband processing circuit 8 and to 11 modulation by the IQ modem. The data input signal is then converted to the IF signal, and the IF signal is up converted (frequency conversion) by a transmission-use mixer 11, which is provided in the RF U/D converter. Then the signal thus modulated is amplified by a power amplifier 9, so as to be a transmission signal, and the transmission signal flows backwards with respect to the reception of signal and then is transmitted from the antenna 1.

In performing a normal communication, such card type wireless communication apparatus is switched over between the transmission and reception alternatively in a short time period by transmitting/receiving switch (TX/RXSW) 3, controlled by a controller (not shown).

Further, in the IQ modem, reception signal strength indicator (RSSI), which is a Direct-Current voltage, is generated by performing, by using a diode or the like, envelope detection of the signal whose has been subjected to band limitation by the IF filter 7. The RSSI is to be inputted to the baseband processing circuit 8 and used for generating various controlling signals as described later.

Note that the receptor circuit section and the transmitter circuit section are supplied with power from a power supply 40.

Embodiment 1

FIG. 1 is a block diagram showing a high frequency circuit section in a wireless communication apparatus of an embodiment 1 according to the present invention; and a main part of the high frequency circuit section includes a power amplifier 9, a bypass route 22, and route switches 23 and 24 for a transmission signal.

The wireless communication apparatus of the present invention, which is a wireless communication apparatus for use in an information terminal device, includes an antenna 1; the power amplifier 9 for transmission, which is to be connected to the antenna 1 when it is selected; the bypass route 22 for bypassing a signal route (amplification route) of the power amplifier 9; and the route switches 23 and 24 (first switches) for selectively switching over between the signal route of the power amplifier 9 and the bypass route 22.

The transmitter circuit section in the high frequency circuit has a detector diode 10. The detector diode 10, which is a schottky diode, performs demodulation (wave detection) of a transmission output signal and feeds back a direct-current component of the transmission output signal to a TX DET circuit (constituted of an operational amplifier or the like), which is normally provided in a baseband processing circuit 8. In accordance with the direct-current component, a gain of an AGC amplifier is automatically adjusted, thereby supplying stable transmission power to an end of the antenna 1. This arrangement involving the detector diode 10 is well-known.

In the embodiment 1, as shown in FIG. 2, the baseband processing circuit 8 has a control means (controller) 18 for controlling operation of the power amplifier 9 and a low-noise amplifier 4 in accordance with the RSSI. The controller 18 controls the switching-over of the route switches 23 and 24 by a property of signal which is indicative of a distance from a communication counterpart, such as strength of the reception signal (level of a high frequency input signal). In order to obtain such function, the controller 18 has a first control signal generating section 18a for generating, in accordance with a voltage of the RSSI, an on/off control signal (a first control signal) that is used for the control of the route switches 23 and 24.

Note that the controller 18 (including a generating section 18a) and switches 23 and 24 for switching over the routes constitute a route-selector for switching over between the amplifier route in which the signal passes through the low-noise amplifier 4 or the power amplifier 9 (for selecting one of the low-noise amplifier and the power amplifier 9), and the bypass route for bypassing the low-noise amplifier 4 or the power amplifier 9.

Moreover, by acquiring data for associating strength of the reception signal with communication distance, it is possible to convert the voltage value of the RSSI into the communication distance. This arrangement may be attained by providing the controller 18 with, for example, a detection section, a storage section (such as a look-up table or the like), and a judgment section. The detection section detects (measures; takes reading of) the strength if the reception signal. The storage section stores the data for associating the strength of the reception signal with the communication distance. The judgment section judges the communication distance in accordance with the data, the communication distance being in association with the strength thus measured. With this arrangement, it is possible to constitute the controller 18 to serve as a communication distance detector for detecting (measuring) the distance to the communication counter part, and as the route-selector.

Further provided in embodiment 1 are the low-noise amplifier 4 and a second switch 41. The second switch 41 is used for stopping supply of power to the power amplifier 9 from the power supply 40. The controller 18 includes a control section 18b for generating a second control signal, which is used for controlling the second switch 41 in accordance to the switching-over of the route switches 23 and 24. The controller 18 and the second switch 41 are used in the same manner in other embodiments described later.

Note that the controller 18 (including a control section 18b) and the second switch 41 constitute a power-supply stopper for stopping supply of power to the low-noise amplifier 4 or the power amplifier 9, in accordance with the switching-over to the bypass route.

Figure 20:
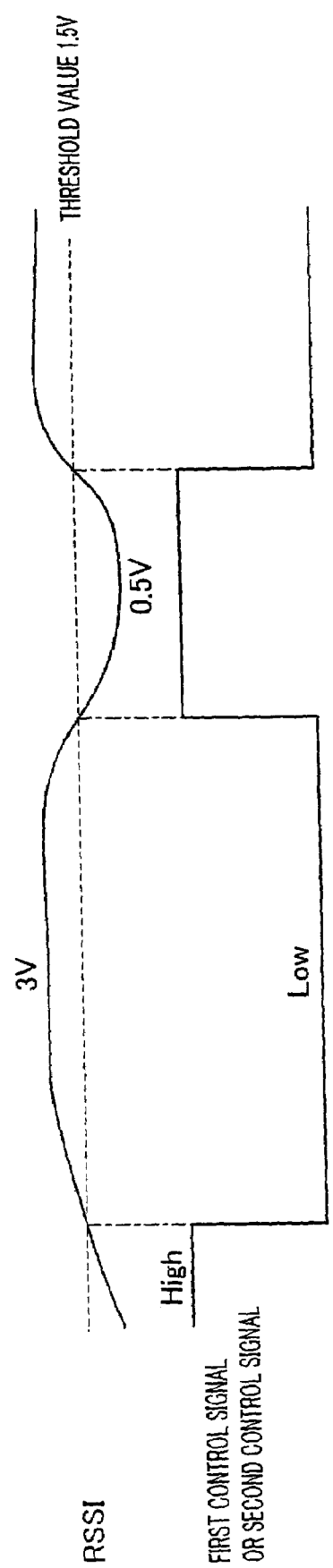
FIG. 20 is a graph showing generation of a first control signal or a second control signal in accordance with the RSSI value.
Figure 21:
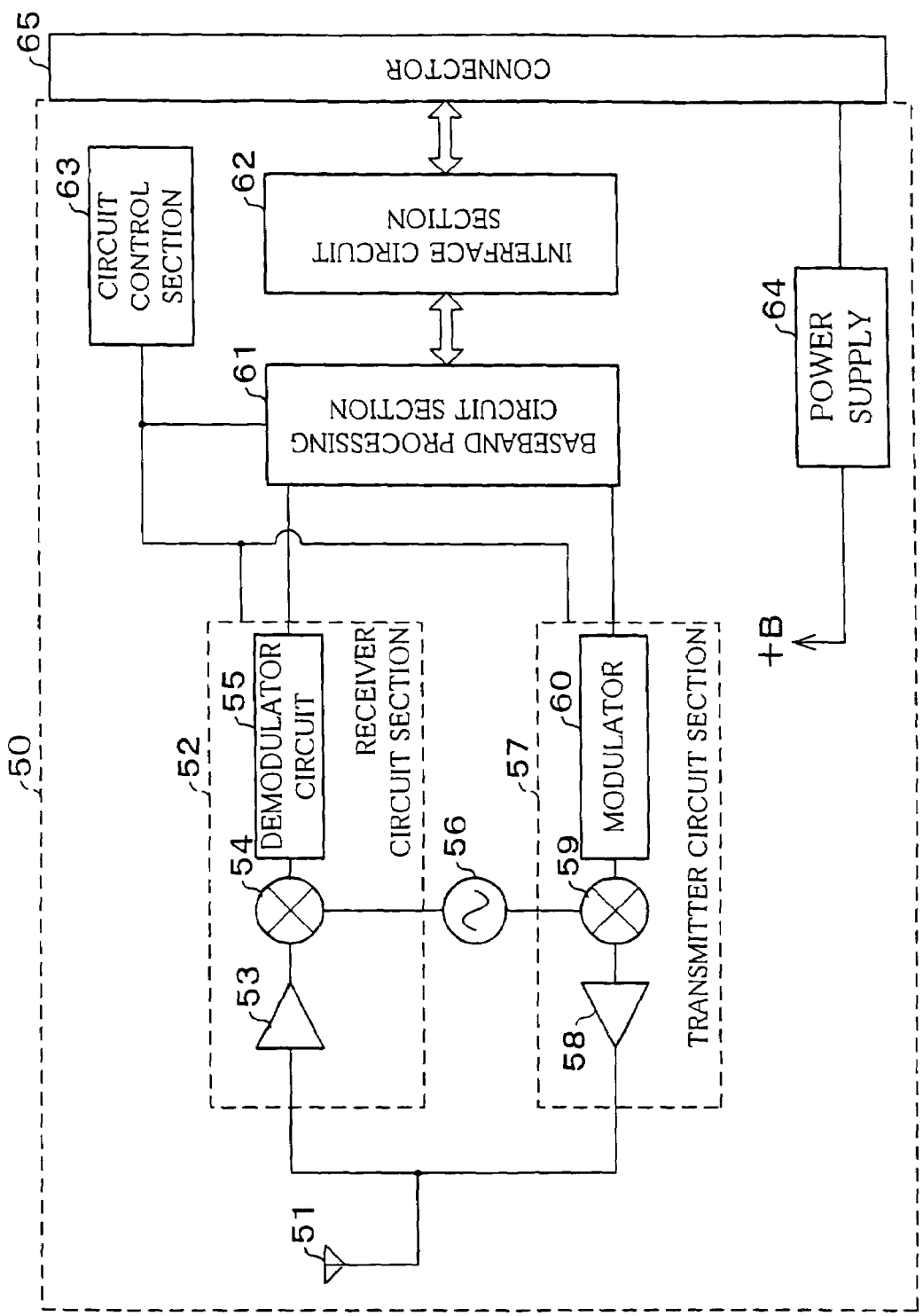
FIG. 21 is a block diagram schematically showing a configuration of a conventional card type wireless communication apparatus.
Figure 22:
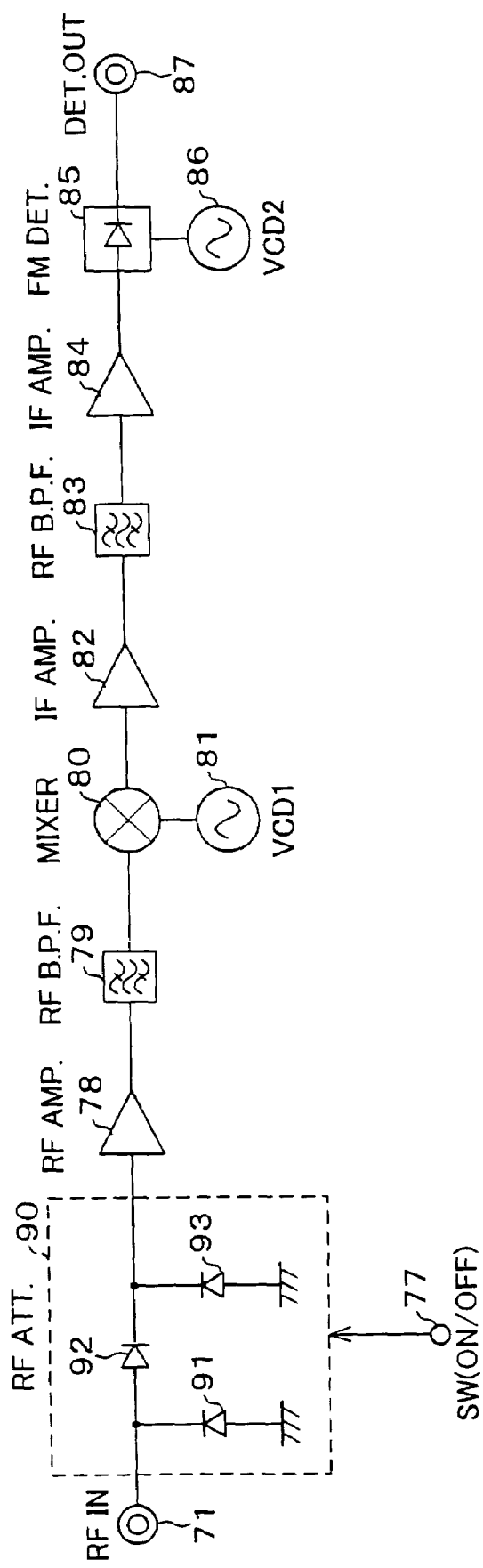
FIG. 22 is a block diagram showing a wireless module adopting a generally used RFAGC circuit.

The RSSI is, as shown in FIG. 20, generated as a DC voltage. It is possible to generate the first control signal or the second control signal, by arranging such that the voltage value of the RSSI is compared with a threshold value for the voltage value of the RSSI (for example, the threshold value is set to 1.5V). For example, as shown in FIG. 20, if the voltage value of the RSSI is lower than the threshold value, it indicates that the strength of the reception signal is weak. Thus, a level of the second control signal is turned to a high level, in order to turn ON the power amplifier 9 or the low-noise amplified. Moreover, if the voltage value of the RSSI is equal to or higher than the threshold value, it indicates that the strength of the reception signal is strong. Thus, the level of the second control signal is turned to a low level, in or er to turn OFF the power amplifier 9 or the low-noise amplifier 4 so that the communication apparatus is turned to a power-saving mode.

Next, an operation process of the configuration in this embodiment is described. In wireless communication, it is needless to say that, when a signal is wirelessly transmitted in a form of electric wave from a host machine (an apparatus such an access point, a router or the like; or a transmitting box or the like), strength of the signal thus transmitted and then received by a receiver circuit varies depending on a distance from the host machine. The wireless communication apparatus uses the reception signal strength indicator (RSSI) to show strength of the electric wave thus received. For example, a mobile phone uses flags to display the strength of the input electric wave indicated by the RSSI. Three flags representing a strongest electric wave reception, and a single flag or no flag for the weakest.

For example, such indicator is obtained by monitoring a DC voltage at a terminal called the RSSI which is provided in the baseband processing circuit 8 shown in FIG. 2, and the indicator is digitally displayed for example in three levels as described above in accordance with predetermined values of the DC voltage.

In the case of the present invention, for example two-level switching-over is carried out by using the voltage value of the RSSI (hereinafter, the voltage value of the RSSI is referred to as RSSI value). Operation of the control means (controller) 18 for this arrangement is explained below, referring to the flow chart of FIG. 10.

Firstly, the controller 18 monitors the direct current voltage (RSSI value) at the RSSI terminal of the baseband processing circuit 8. When the controller 18 detects (measures) the RSSI value, the controller 18 judges whether or not the RSSI value thus measured is lower than a predetermined level (Step (hereinafter, S) 1).

If an RSSI value is higher than a predetermined level, the controller 18 judges that the host machine is in a close distance (S2). In such case the bypass route 22 is selected by the route switches 23 and 24, which are controlled by whether or not an on/off signal (PA_CTRL) is supplied from the baseband processing circuit 8 (controlling system controller). Specifically, the controller 18 causes the generating section 18a to generate the first control signal (that is for controlling the switches 23 and 24) (S3), the first control signal being for switching over from the signal route of the power amplifier 9 to the bypass route 22.

Here, the second switches 41 is turned OFF in accordance with the switching-over of the route switches 23 and 24, so as to stop the supply of the power to the power amplifier 9. In order to stop the supply of the power to the power amplifier 9, the controller 18 causes the control section 18b to generate the second control signal that is for turning OFF the second switch 41 (S4).

On the other hand, if, at S1, the RSSI value thus measured is lower than the predetermined level, the controller 18 judges that the host machine is in a far distance (S5). In such case, to amplify the transmission signal by the power amplifier 9 before outputting the transmission signal, the route of the power amplifier is selected by the route switches 23 and 24, which are controlled by whether or not the on/off signal (PA_CTRL) is supplied from the baseband processing circuit 8. Specifically, the controller 18 causes the generating section 18a to generate the first control signal that is for controlling the switches 23 and 24, in order to switch over from the bypass route 22 to the signal route of the power amplifier 9 (S6).

In this case, the second switch is turned ON in accordance with the switching-over of the route switches 23 and 24, so that the power amplifier 9 is supplied with the power and activated for amplification of the signal. In order to supply the power (allow the supply of the power), the controller 18 causes the control section 18b to generate the second control signal that turns ON the second switch 41 (S7).

Note that the present embodiment may be so arranged that a user of the communication apparatus can switch over the switches 23 and 24, and turn ON/OFF the second switch 41 manually and forcibly, the switches 23 and 24, and the second switch 41 operating (switching over/turning ON/OFF) in concert. For example, this arrangement allows selecting of the bypass route 22 manually in such a situation that the user prefers power-saving communication because a battery of the communication apparatus is running out.

With this arrangement, the communication can be so performed that the power amplifier 9 of this embodiment is turned OFF when a communication counterpart (host machine or the like) is in a close distance. This dramatically reduces power consumption, thereby attaining "an improvement of a battery duration" and "an energy-saving design".

Embodiment 2

Figure 3:
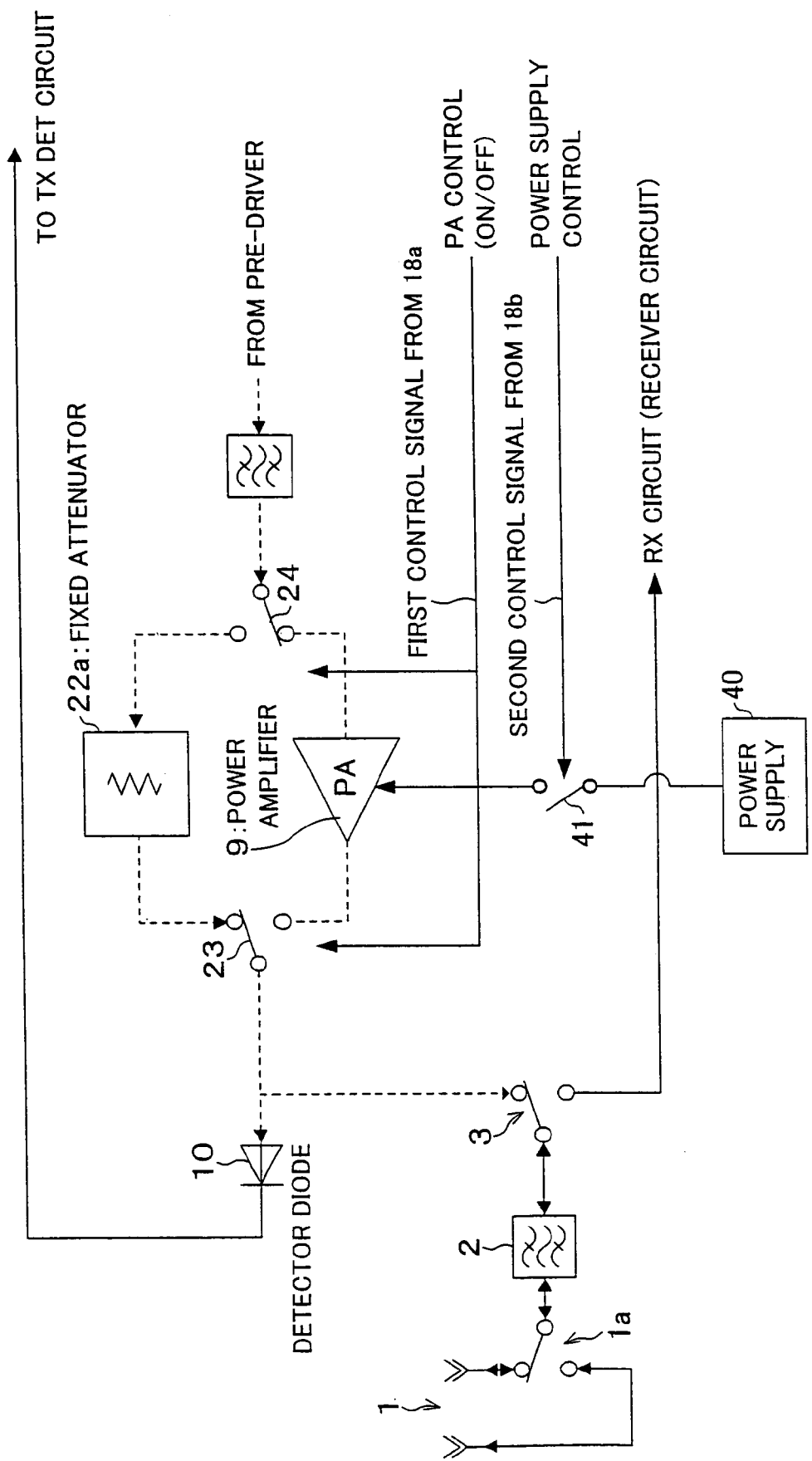
FIG. 3 is a block diagram of the card type wireless communication circuit of another embodiment according to the present invention, showing a specific example of switching-over between a power amplifier and a fixed attenuator.

FIG. 3 is a block diagram showing a high frequency circuit section in a wireless communication apparatus of another embodiment according to the present invention. The high frequency circuit section in FIG. 3 is modified from that of FIG. 1 as follows. A main part of the high frequency circuit section includes a power amplifier 9 for transmission, and a fixed attenuator 22a provided instead of the bypass route 22 shown in FIG. 1, and route switches 23 and 24 for switching over routes for a transmission signal. A detection diode 10 has the same function as that of the embodiment 1.

Figure 11:
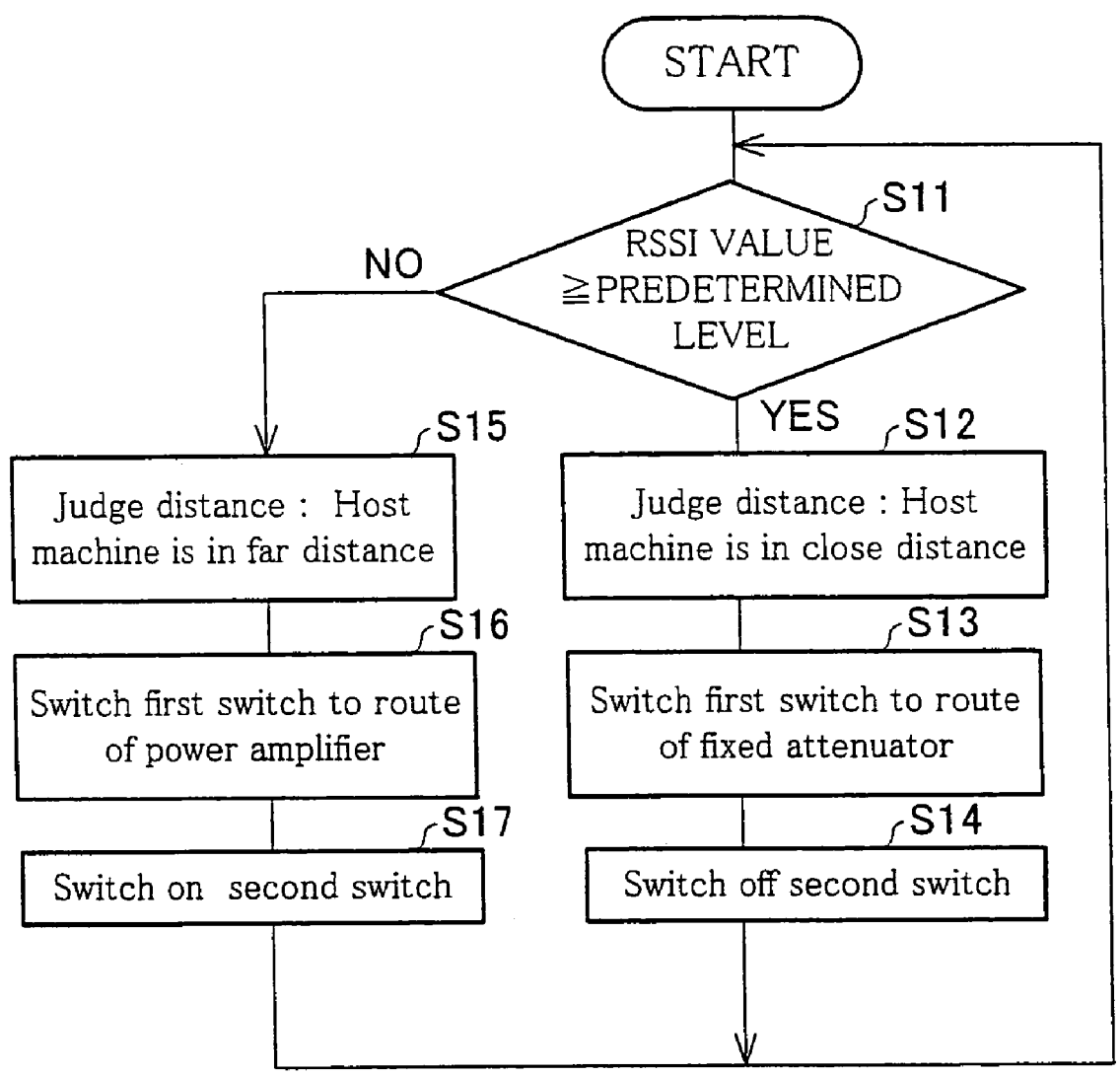
FIG. 11 is a flow chart showing how, in a transmission system, (a) switching-over between a power amplifier and a fixed attenuator, and (b) supply of power to the power amplifier, are controlled in accordance with an RSSI value.

Next described is an operation process of this configuration. This card-type wireless communication apparatus performs two-level switching-over by using an RSSI value in accordance with a distance from a host machine (e.g. an apparatus such an access point, a router or the like; or a transmitting box or the like). Operation of a controller 18 for this case is explained below, referring to the flow chart of FIG. 11.

Firstly, the controller 18 monitors a direct current voltage (RSSI value) at a RSSI terminal of a baseband processing circuit 8. When the controller 18 detects (measures) the RSSI value, the controller 18 judges whether or not the RSSI value thus measured is lower than a predetermined level (S11)

If an RSSI value is equal to or higher than a predetermined level, the controller 18 judges that the host machine is perceived to be in a close distance (S12). In such case a route passing the attenuator 22a is selected by the route switches 23 and 24, which are controlled by whether or not an on/off signal (PA_CTRL) is supplied from the baseband processing circuit 8. Specifically, the controller 18 causes a generating section 18a to generate a first control signal that is for controlling the switches 23 and 24 (S13)), the first control signal being for switching over from a signal route of a power amplifier 9 to a route of the fixed attenuator 22a.

Here, a second switch 41 is turned OFF in accordance with the switching-over of the route switches 23 and 24, so as to stop supply of power to the power amplifier 9. In order to stop the supply of the power to the power amplifier 9, the controller 18 causes a control section 18b to generate a second control signal that is for turning OFF the second switch 41 (S14).

On the other hand, if, at S11, the RSSI value thus measured is lower than the predetermined level, the controller 18 judges that the host machine is in a far distance (S15). In such case, to amplify a transmission signal by the power amplifier 9 before outputting the transmission signal, a route passing the power amplifier is selected by the route switches 23 and 24, which are controlled by whether or not an on/off signal (PA_CTRL) is supplied from the baseband processing circuit 8. Specifically, the controller 18 causes the generating section 18a to generate the first control signal (that is for control the switches 23 and 24) (S16), in order to switch over from the signal route of the fixed attenuator 22a to the signal route of the power amplifier 9.

Here, the second switch is switched ON in accordance with the switching-over of the route switches 23 and 24, so that the power amplifier 9 is supplied with the power and activated for the amplification of the signal. In order to allow the supply of the power, the controller 18 causes the control section 18b to generate the second control signal that is for turning ON the second switch 41 (S17).

Note that the present embodiment may be so arranged that a user of the communicator apparatus can switch over the switches 23 and 24, and turn ON/OFF the second switch 41 manually and forcibly, the switches 23 and 24, and the second switch 41 operating (switching over/turning ON/OFF) in concert. For example, this arrangement allows selecting of the signal route of the fixed attenuator 22a manually in such a situation that the user prefers power-saving communication because a battery of the communication apparatus is running out.

This embodiment 2 is so arranged that the power amplifier 9 for transmission, the fixed attenuator 22a, and the route switches 23 and 24 for controlling the respective ON/OFF states of the power amplifier 9 and the fixed attenuator 22a are provided in a high frequency amplification stage of a transmitter circuit block, and the route switches 23 and 24 are used for selecting one of the power amplifier 9 and the fixed attenuator 22a by switching over in accordance with a level of the high frequency input signal (RSSI) inputted into a reception block, the level varied depending on a distance from a communication counterpart, such as the host machine (e.g., an apparatus such an access point, a router or the like; or a transmitting box or the like). In this arrangement, the selected one of the power amplifier 9 and the fixed attenuator 22a becomes part of a close circuit.

Thus, this embodiment brings about the same effects of the embodiment 1; that is, "an improvement of a battery duration" and "energy-saving design". Further in a case that the route passing the fixed attenuator 22a is automatically selected for communication with the host machine in the close distance, the wireless communication apparatus in this embodiment further reduces a level of disturbance to a communication equipment (other than the wireless communication apparatus of this invention and the host machine thereof) which uses the same frequency band as the wireless communication apparatus of this invention and the host machine thereof, compared to embodiment 1 in which the bypass route 22 is used.

This becomes very important, particularly when applying this invention to a wireless LAN or the like that is in compliance with IEEE802.11b. IEEE 802.11b is a standard using a frequency included in 2.4 GHz-band. Because various fields such as industry, science, and medical science can freely use this frequency included in 2.4 GHz-band, various apparatuses such as bluetooth-using devices, microwave ovens, POS terminals, and security cameras are emitting electronic waves of this frequency band. Under such circumstance, a suppression of an electric wave emission level is etiquette, and is an important function.

Further, in case where the RSSI value is higher than a predetermined level, that is, for the communication distance shorter than a predetermined value, the fixed attenuator 22a is selected so as to reduce a current value of a transmission signal. Therefore, compared with the arrangement shown in FIG. 1, in which the fixed attenuator 22a is not provided, the arrangement of the present embodiment further saves power consumption from the battery.

Figure 19:
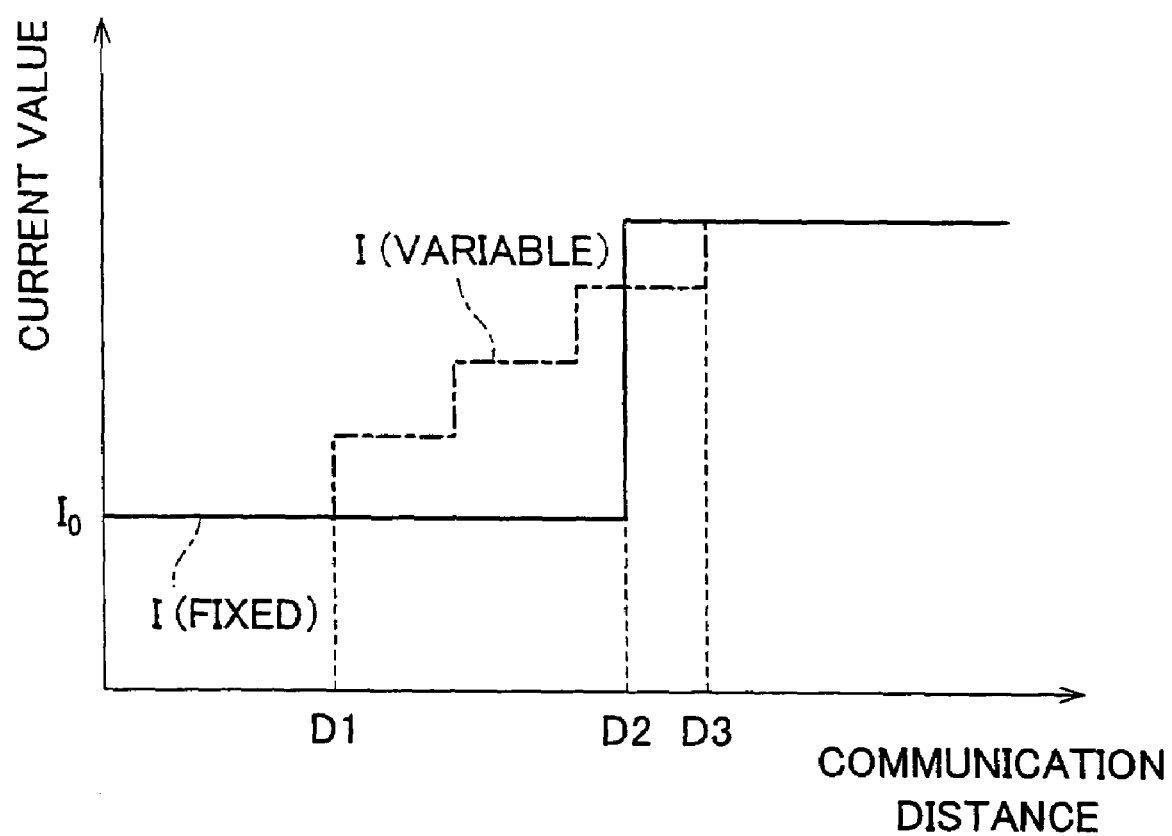
FIG. 19 is an explanatory view showing relationship between communication distance and attenuation of a transmission signal, the attenuation performed by the fixed attenuator or the variable attenuator.

Moreover, in the following condition, the present embodiment is more advantageous in terms of the power consumption from the battery, compared with an arrangement in which, as in a next-described embodiment 3, a variable attenuator 22b is used instead of the fixed attenuator 22a so that the current value of the transmission signal is reduced (adjusted) stepwise in accordance with the communication distance. The condition is that, as shown in FIG. 19, a communication range (distance D1 to D2) is wider than a communication range (distance D2 to D3), where a communication range (distance D1 to D2) is a communication range within which a current value I (fixed) obtained by using the fixed attenuator 22a is smaller than a current value I (variable) obtained by using the variable attenuate 22b, whereas distance D2 to D3 is a communication range within which the current value I (variable) is smaller than the current value I (fixed) in case where the current value of the transmission signal is reduced to a predetermined value 10 for performing communication of a certain communication distance.

Embodiment 3

Figure 4:
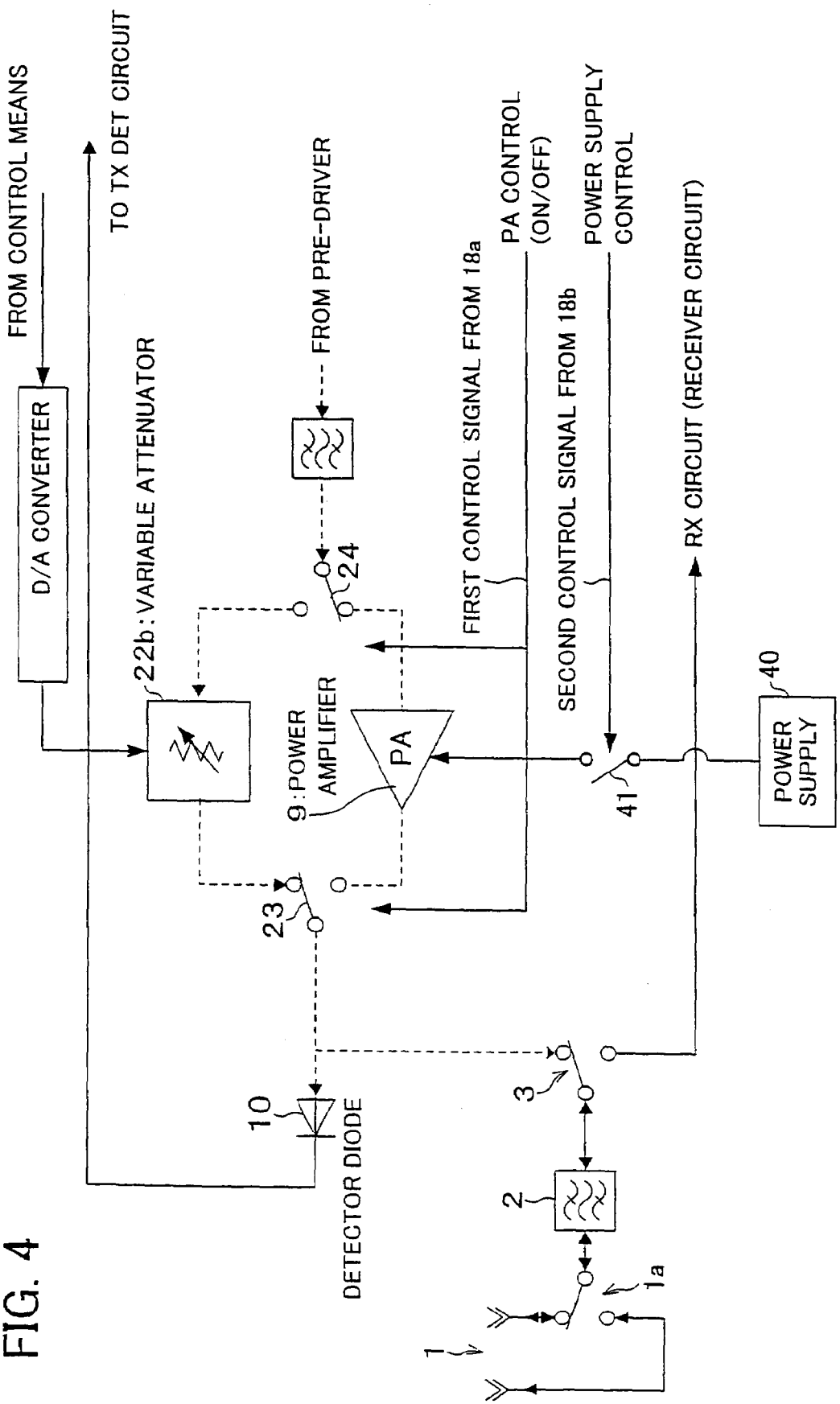
FIG. 4 is a block diagram of the card type wireless communication circuit of yet another embodiment according to the present invention, showing a specific example of switching-over between a power amplifier and a variable attenuator.

FIG. 4 is a block diagram showing a high frequency circuit section in a wireless communication apparatus of yet another embodiment according to the present invention. The high frequency circuit section in FIG. 4 is modified from the arrangement of FIG. 1 as follows. A main part of the high frequency circuit section includes a power amplifier 9 for transmission, and a variable attenuator 22b provided instead of the bypass route 22 shown in FIG. 1, and switches 23 and 24 for switching over routes for a transmission signal. A role of a detection diode 10 is the same as the previous description.

Figure 12:
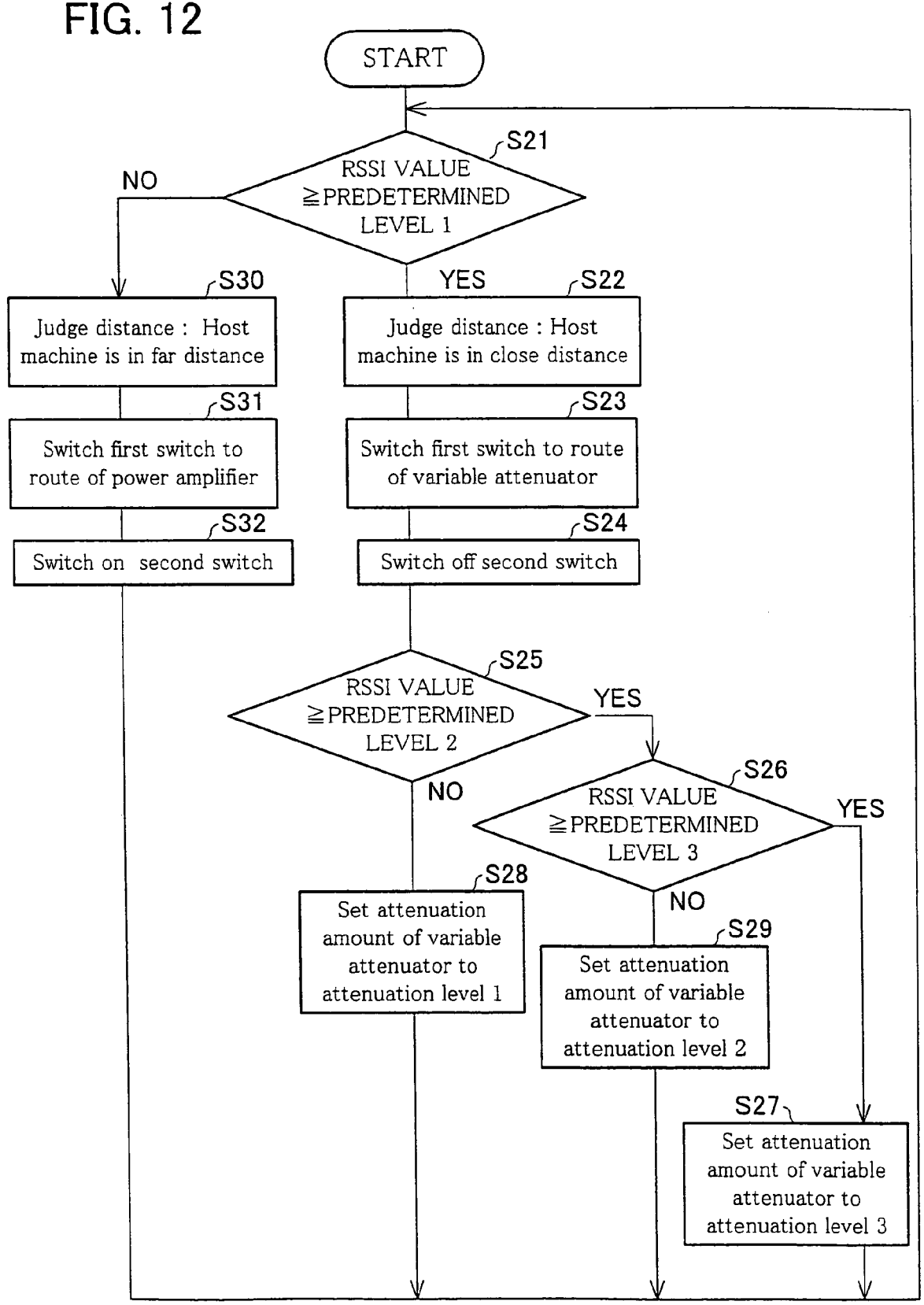
FIG. 12 is a flow chart showing how, in a transmission system, (a) switching-over between a power amplifier and a variable attenuator, (b) a switching-over of attenuation amount of the variable attenuator, and (c) supply of power to the power amplifier, are controlled in accordance with an RSSI value.

Next described is an operation process of this configuration. By using an RSSI value, the card-type wireless communication apparatus performs such switching-over that attenuation amount can be delicately adjusted according to a distance from a host machine (e.g. an apparatus such an access point, a router or the like; or a transmitting box or the like). Operation of a controller 18 for this arrangement is explained below, referring to the flow chart of FIG. 12.

Firstly, the controller 18 monitors the direct current voltage (RSSI value) at an RSSI terminal of a baseband processing circuit 8. When the controller 18 detects (measures) the RSSI value, the controller 18 judges whether or not the RSSI value thus measured is lower than a predetermined level 1 (S21).

If an RSSI value is higher than the predetermined level 1, the controller 18 judges that the hot machine is in a close distance (S22). In such case, a route passing the variable attenuator 22b is selected by the route switches 23 and 24, which are controlled by whether or not an on/off signal (PA_CTRL) is supplied from the baseband processing circuit 8. Specifically, the controller 18 causes a generating section 18a to generate a first control signal that is for controlling the switches 23 and 24 (S23), in order to switch over from a signal route of a power amplifier 9 to a signal route of the variable attenuator 22b.

Here, supply of power to the power amplifier 9 is stopped by the second switch 41, which is turned OFF in accordance with the switching-over of the switches 23 and 24. In order to stop the supply of the power to the power amplifier 9, the controller 18 causes a control section 18b to generate a second control signal that is or turning OFF the second switch 41 (S24).

After that, the baseband processing circuit 8 divides an attenuation amount into a number of levels in accordance with a resolution ability of an D/A converter (of 4 bits, for example) in accordance with a level of an electric wave, which depends on a distance (communication distance) from the host machine. For example, if using 4-bit D/A converter, and 40 dB is a total amount that can be attenuated, the attenuation amount per level is 2.5 dB.

For example, the controller 18 judges whether or not the RSSI value thus measured is lower than a predetermined level 2, which is higher than the predetermined level 1 (S25).

If the RSSI value thus measured is equal to or higher than the predetermined value 2, the controller 18 further judges whether the RSSI value thus measured is lower than a predetermined value 3, which is higher than a predetermined value 2 (S26). Here, assuming that the predetermined value 3 is the highest among the multileveled threshold values, the controller 18 sets the attenuation amount of the variable attenuator 22b to an attenuation level 3 (maximum attenuation amount) by using an D/A converter, if the RSSI value is equal to or higher than the predetermined level 3 (S27).

On the other hand, if, at S25, the RSSI value thus measured is less than the predetermined level 2, the attenuation amount of the variable attenuator 22b is set to an attenuation level 1 (minimum attenuation amount) that corresponds to the predetermined level 1 (S28). Further, if, at S26, the RSSI value thus measured is less than the predetermined level 3, the attenuation amount of the variable attenuator 22b is set to an attenuation level 2 that corresponds to the predetermined level 2 (S19).

Note that the predetermined levels 1 to 3 to be compared with the RSSI value, and the attenuation levels 1 to 3, which respectively correspond to the predetermined levels 1 to 3, are stored in a memory (such as a look-up table or the like), which the controller 18 can access.

On the other hand, if, at S21, the RSSI value is lower than the predetermined level 1, the contoller 18 judges that the host machine is in a far distance (S30). In such case, to amplify a transmission signal by the power amplifier 9 before outputting the transmission signal, the route passing the power amplifier 9 is selected by the route switches 23 and 24, which are controlled by whether or not an on/off signal (PA_CTRL) is supplied from the baseband processing circuit 8. Specifically, the controller 18 causes a generating section 18a to generate a first control signal that is for controlling the switches 23 and 24 (S31), in order to switch over from a signal route of the variable attenuator 22b to a signal rote of the power amplifier 9.

Here, the second switch is turned ON in accordance with the switching-over of the route switches 23 and 24, so that the power amplifier 9 is supplied with the power and activated for the amplification of the signal. In order to allow the supply of the power to the power amplifier 9, the controller 18 causes a control section 18b to generate a second control signal that is for turning ON the second switch 41 (S32).

Note that the present embodiment may be so arranged that a user of the communication apparatus can switch over the switches 23 and 24, and turn ON/OFF the second switch 41 manually and forcibly, the switches 23 and 24, and the second switch 41 operating (switching over/turning ON/OFF) in concert. For example, this arrangement allows selecting of the signal route of the variable attenuator 22b in such a situation that the user prefers power-saving communication because a battery of the communication apparatus is running out.

This embodiment 3 is so arranged that the power amplifier 9 for transmission, the variable attenuator 22b, and the route switches 23 and 24 for controlling the power amplifier 9 and the variable attenuator 22b are provided in a high frequency amplification stage of a transmitter circuit block, and the route switches 23 and 24 are used for selecting one of the route passing the power amplifier 9, and the route passing the variable attenuator 22b by switching over in accordance with a level of the high frequency input signal (RSSI) inputted into a reception block, the level varied depending on the distance from a communication counterpart, such as the host machine (e.g. an apparatus such an access point, a router or the like; or a transmitting box or the like). In this arrangement, the selected one of the power amplifier 9 and the variable attenuator 22b becomes part of a close circuit.

Thus, this embodiment brings about the same effects of the embodiment 1; that is, "an improvement of a battery duration" and "energy-saving design". Further, in a case that the route passing the variable attenuator 22b is automatically selected for communication with the host machine in the close distance, the wireless communication apparatus in this embodiment further reduces a level of disturbance to a communication equipment (other than the wireless communication apparatus of this invention and the host machine thereof) which uses the same frequency band as the wireless communication apparatus of this invention and the host machine thereof, compared to a case of using the bypass route 22 described in embodiment 1.

Further, in case of embodiment 2 in which the fixed attenuator 22a is used, it should not be so arranged that the fixed attenuator 22a has a large attenuation amount, on the grounds that such large attenuation amount possibly shortens a communication range. However, the variable attenuator 22b can varies the attenuation amount in accordance with the level of the high frequency input signal (RSSI), so that the communication can be carried out with a largest affordable attenuation amount that the communication can afford (the largest affordable attenuation amount is an attenuation amount at which communication can be performed while minimizing adverse effect on external devices (other devices)). This brings about more effective suppression of a level of an electric wave radiation that disturbs external apparatuses, compared with the embodiment 2.

If the strength of the transmission signal was unnecessarily large (larger than a necessary strength), possibility would be higher that the transmission signal adversely affects electronic devices, especially, the electronic devices using a frequency near the frequency band of the communication apparatus, and electronic devices using a reception frequency near a frequency band of a high frequency wave component of an interference wave, and the like electronic apparatus. Therefore, by selecting, in accordance with the level of the RSSI value, a most suitable attenuation rate for communication state or communication distance of a moment, a radiation level of the interfering electronic wave, which adversely affects the electronic devices in the surrounding, can be reduced to a most appropriate level of the moment, without sacrificing the communication state or the communication distance. As a result, it is possible to minimize the possibility that the transmission signal adversely affects the electronic devices and the like.

Embodiment 4

Figure 5:
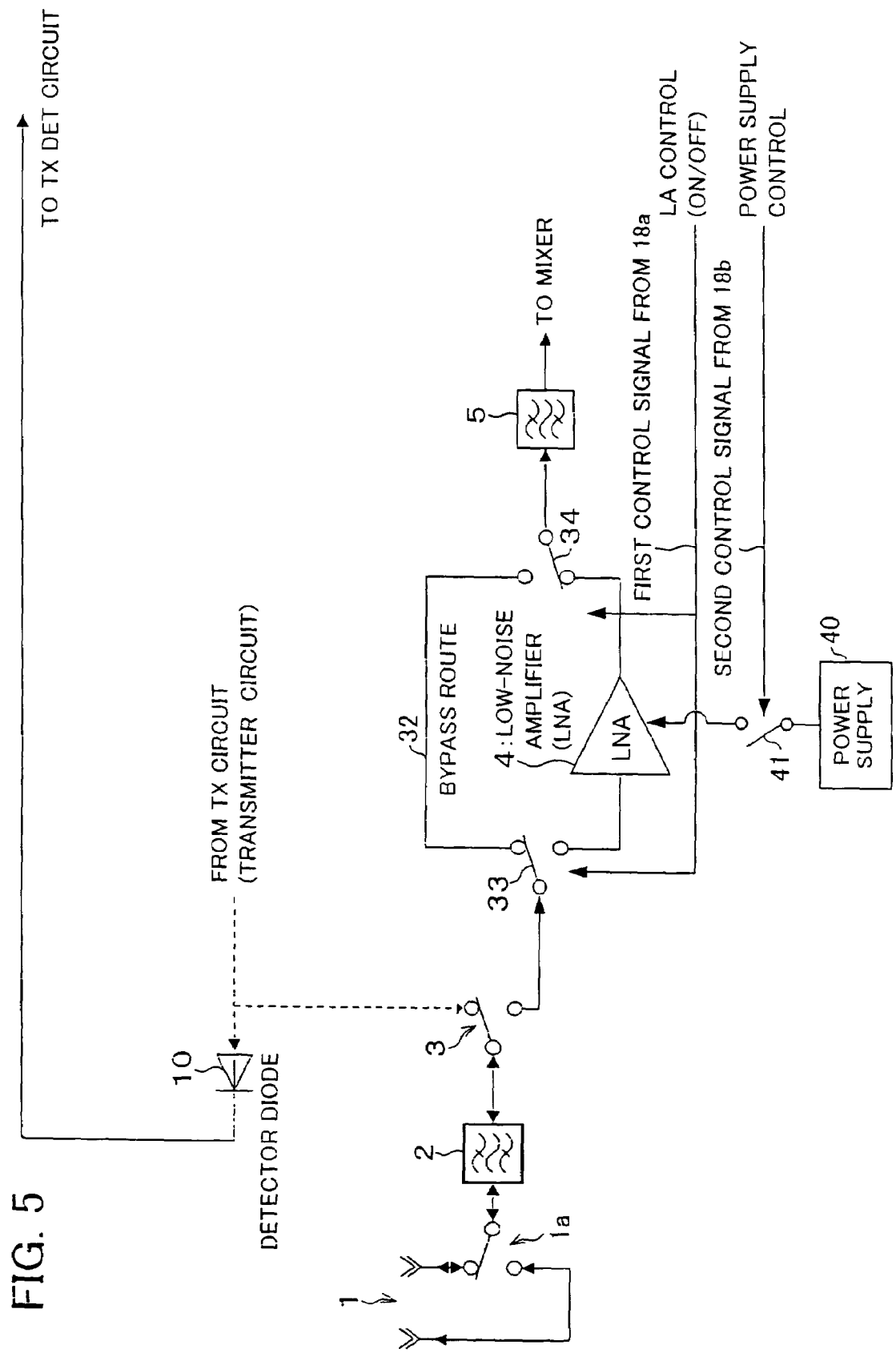
FIG. 5 is a block diagram of the card type wireless communication circuit of still another embodiment according to the present invention, showing a specific example of switching-over between a low-noise amplifier for reception, and a bypass circuit.
Figure 10:
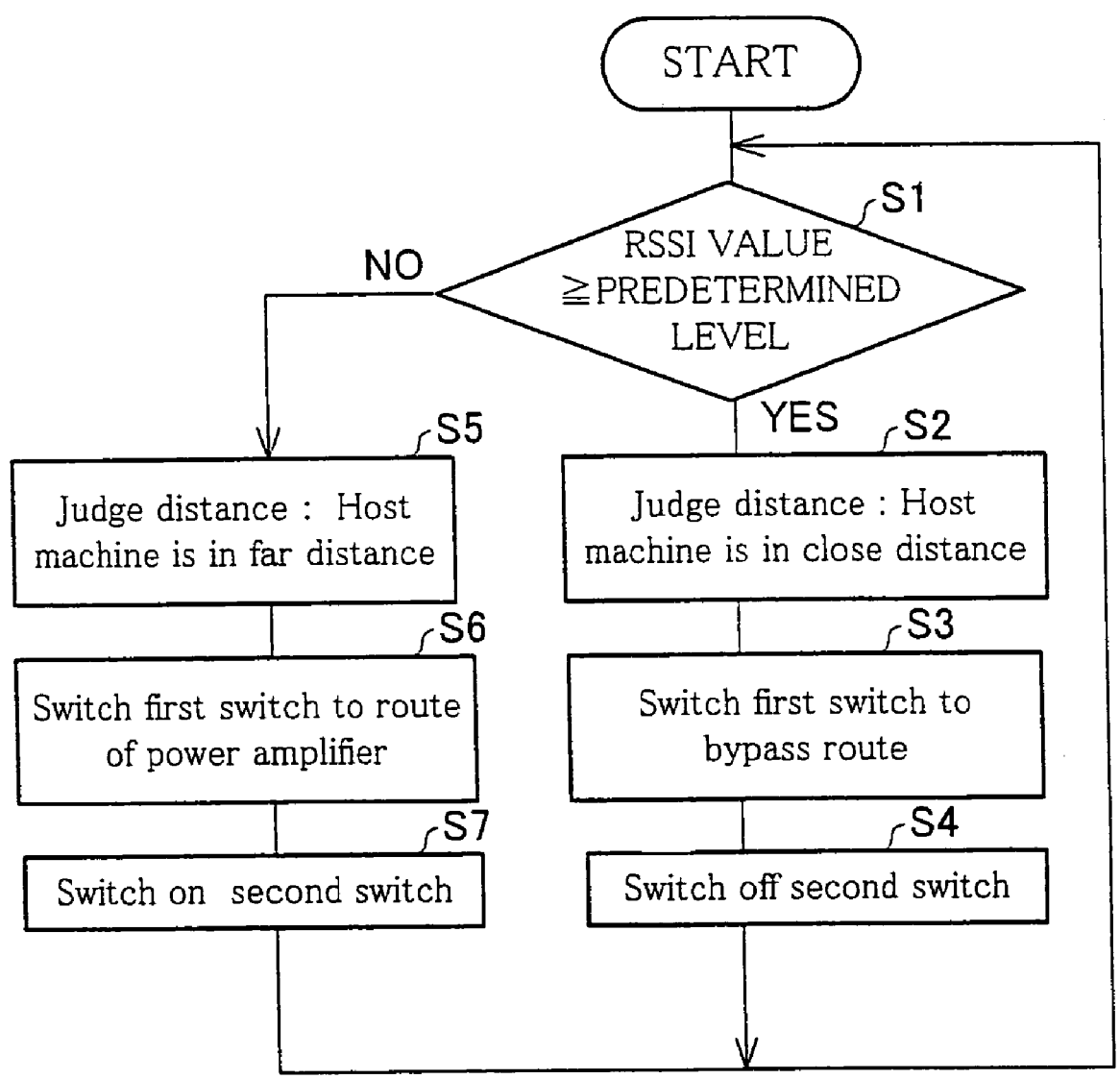
FIG. 10 is a flow chart showing how, in a transmission system, (a) switching-over between a power amplifier and a bypass route and (b) supply of power to the power amplifier, are controlled in accordance with an RSSI value.

FIG. 5 is a block diagram showing a high frequency circuit section in a wireless communication apparatus of still another embodiment according to the present invention. The high frequency circuit section in FIG. 5 is modified from that of FIG. 1 as follows. A main part of the high frequency circuit includes a low-noise amplifier (LNA) 4 for reception, and a bypass route 32, route switches 33 and 34 (first switches) for switching over routes of a reception signal.

Therefore, a wireless communication circuit according to the present invention, which is a wireless communication circuit for use in information transmission and reception terminal (device), is so arranged as to be provided with: an antenna 1; a low-noise amplifier 4, which serves as an amplifier to be connected with the antenna 1; a bypass route 32 for bypassing a signal route of the low-noise amplifier 4;

and switches (first switches) 33 and 34 for alternatively switching over the signal route of the low-noise amplifier 4 and the bypass route 32. Note that, a second switch 41 is provided between the low-noise amplifier 4 and a power supply 40 for supplying power to the low-noise amplifier 4. The second switch 41 turns ON and OFF in accordance with a second control signal generated by a control section 18b.

Like the switches 23 and 24 in the embodiment 1, the route switches 33 and 34 switch over according to whether or not a control (ON/OFF) signal is supplied from a controller 18 to the route switches 33 and 34. Further, power to the low-noise amplifier 4 is supplied and stopped by the second switch 41 in accordance with the switching-over of the switches 33 and 34.

Figure 13:
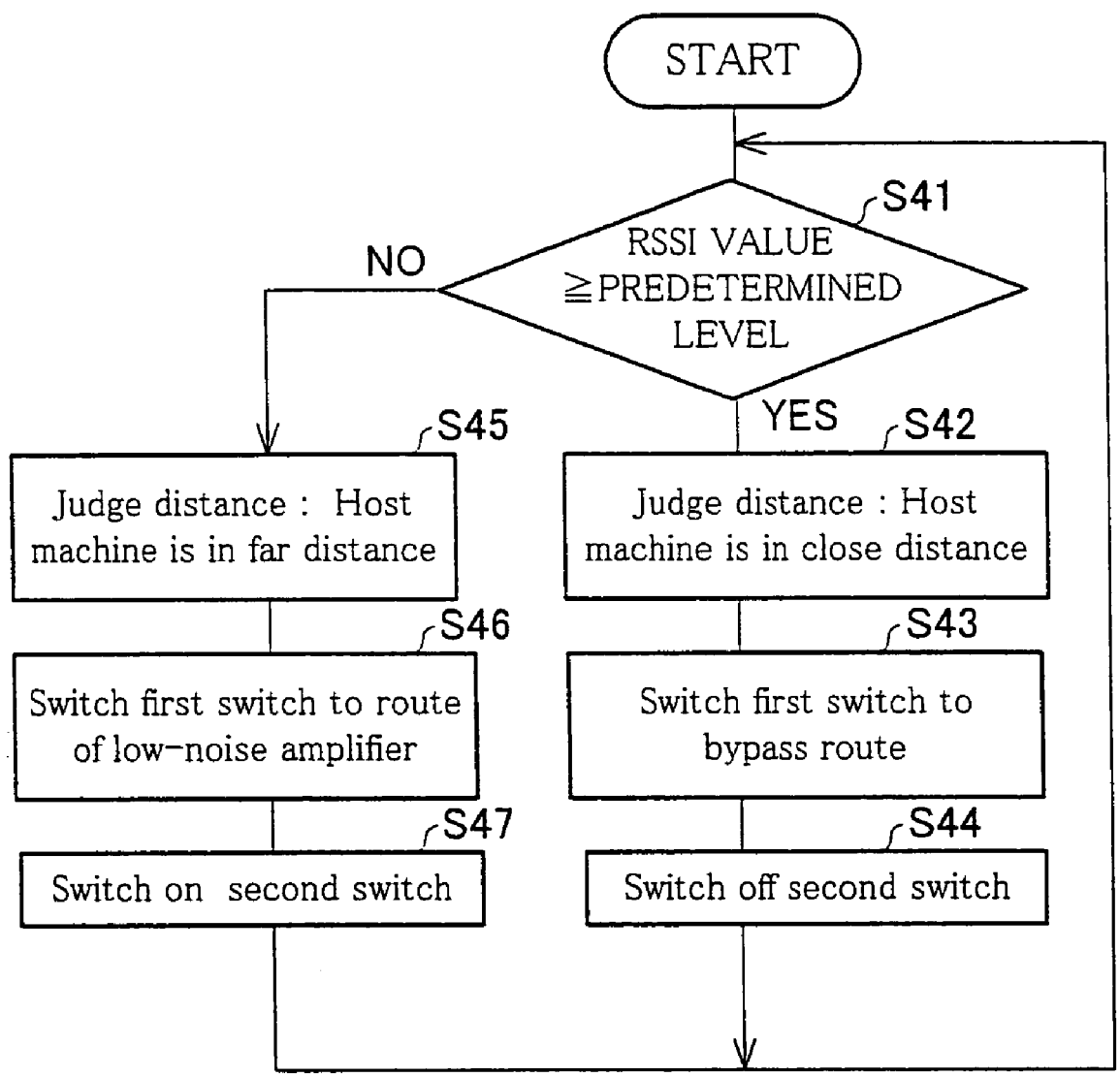
FIG. 13 is a flow chart showing how, in a receiving end, (a) switching-over between a low-noise amplifier and a bypass route, and (b) supply of power to the low-noise amplifier, are controlled in accordance with an RSSI value.

Next described is an operation process of this configuration. This card-type wireless communication apparatus performs two-level switching-over, by using an RSSI voltage, in accordance with a distance from a host machine (e.g. an apparatus such an access point, a router or the like; or a transmitting box or the like). The route switches 33 and 34 are initially set to select a route passing the low-noise amplifier 4. Operation of a controller 18 for this arrangement is explained below, referring to the flow chart of FIG. 13.

Firstly, the switches 33 and 34 are initially switched over to the low-noise amplifier 4. This is because initial reception of the signal can be more smooth performed if it is so set that the communication mode is switched over from a normal mode (in which the power is supplied) to a power-saving mode (in which the bypass route 32 is selected) according to communication state, than if it is so set that the communication mode is switched over from the power-saving mode to the normal mode.

Next, the controller 18 monitors the direct current voltage (RSSI value) at the RSSI terminal of the baseband processing circuit 8. When the controller 18 detects (measures) the RSSI value, the controller 18 judges whether or not the RSSI value thus measured is lower than a predetermined level (S41).

If an RSSI value is higher than a predetermined level at a moment when a linkage to the host machine is established, the controller 18 judges that the host machine is in a close distance (S42). In such case the bypass route 32 is selected by the route switches 33 and 34, which are controlled by whether or not an LNA_CTRL signal is supplied from the baseband processing circuit 8. Specifically, the controller 18 causes a generating section 18a to generate a first signal that is for controlling the route switches 33 and 34 (S43), in order to switch over from the route of the low-noise amplifier 4 to the bypass route 32.

Here, the second switch 41 is turned OFF, in accordance with the switching-over of the route switches 33 and 34, so as to stop the supply of the power to the low-noise amplifier 4. In order to stop the supply of the power to the low-noise amplifier 4, the controller 18 causes the control section 18b to generate a second control signal that is for turning OFF the second switch 41 (S44).

On the other hand, if, at S41, the RSSI value is lower than the predetermined level, the controller 18 judges that the host machine is in a far distance (S45). In such case, according to whether or not the LNA_CTRL signal is supplied from the baseband processing circuit 8 to the switches 33 and 34, the switches 33 and 34 are switched to the low-noise amplifier 4 so that a signal is amplified by the low-noise amplifier 4 and then sent to a LPF 5, which is a next stage receptor circuit. Specifically, the controller 18 causes the generating section 18a to generate the first signal that is for controlling the switches 33 and 34 (S46), in order to switch over from the bypass route 32 to the route of the low-noise amplifier 4.

Here, the second switch 41 is turned ON in accordance with the switching-over of the switches 33 and 34 so that the low-noise amplifier 4 is supplied with power and activated for the amplification of the signal. In order to allow the supply of the power to the low-noise amplifier 4, the controller 18 causes the control section 18b to generate the second control signal that turns ON the second switch 41 (S47).

Note that the present embodiment may be so arranged that the switching-over of the switches 33 and 34, and the turning ON/OFF of the second switch 41 can be manually switched over/turned ON/OFF forcibly by a user of the communication apparatus, the switching-over of the switches 33 and 34, and the turning ON/OFF of the second switch 41 operating in concert. For example, this arrangement allows selecting of the bypass route 32 in such a situation that the user prefers power-saving communication because a battery of the communication apparatus is running out.

This embodiment 4 is so arranged that the low-noise amplifier 4 for reception, the bypass route 32, and the switches 33 and 34 for controlling the low-noise amplifier 4 and the bypass route 32 are provided in a high frequency amplification stage of a receptor circuit block, and the switches 33 and 34 are used for selecting one of the low-noise amplifier 4 and bypass route 22 by switching over in accordance with a level of the high frequency input signal (RSSI) inputted to the reception block, the level varied depending on the distance from the host machine (e.g. an apparatus such an access point, a router or the like; or a transmitting box or the like). In this arrangement, the selected one of the low-noise amplifier 4 and bypass route 22 becomes part of a close circuit.

With this arrangement, when the by as route 32 is selected, the power consumption is reduced as much as the power saved by not using the generally used low-noise amplifier 4. In a current wireless LAN car in compliance with IEEE802.11b, for example, the low-noise amplifier 4 consumes a twentieth of an entire power consumption within the wireless LAN card.

Therefore, if the distance from the host machine is so nearer than the threshold (the predetermined level), the power consumption is lower than the conventional art. This brings about an energy-saving design, and attains that a mobile information terminal device (a notebook-type PC, a PDA, a portable telephone, or the like) or the like device adopting the wireless communication apparatus (client) of this invention can perform battery-driven communication for a longer time. As for a setting of the threshold, it is described later.

Embodiment 5

FIG. 6 is a block diagram showing a high frequency circuit section in a wireless communication apparatus of yet still another embodiment according to the present invention. The high frequency circuit section in FIG. 6 is modified from that of FIG. 5 as follows. A main part of the high frequency circuit section includes a low-noise amplifier 4 for transmission, a fixed attenuator 32a (in replacement of the bypass route 32 shown in FIG. 5), and route switches 33 and 34 for switching over routes for a reception signal. Note that a second switch 41 is provided between the low-noise amplifier 4 and a power supply 40 for supplying power to the low-noise amplifier 4. The second switch 41 turns ON and OFF in accordance with a second control signal generated by a control section 18b.

Figure 14:
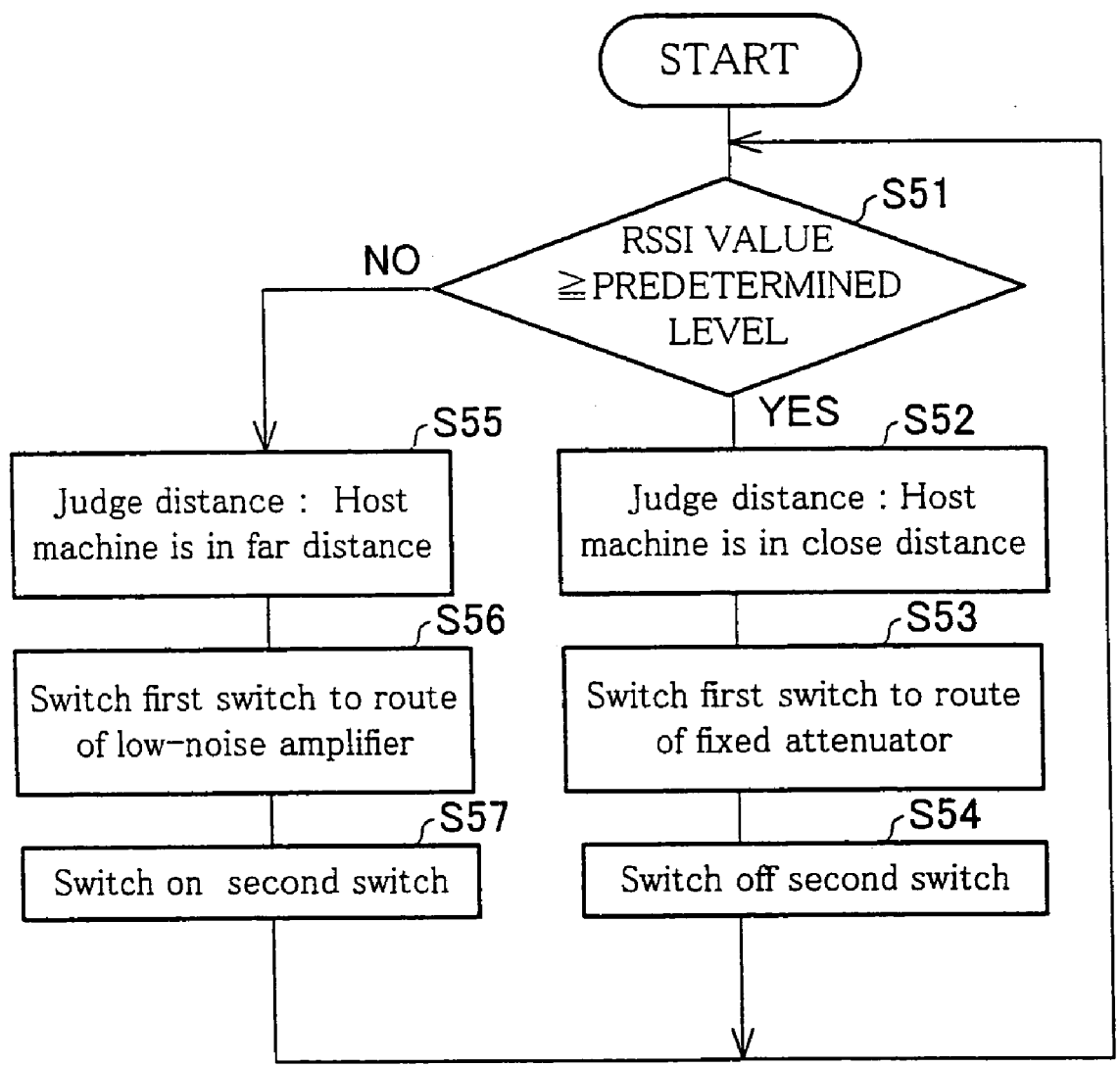
FIG. 14 is a flow chart showing how, in a receiving end, (a) switching-over between a low-noise amplifier and a fixed attenuator, and (b) supply of power to the low-noise amplifier, are controlled in accordance with an RSSI value.

Next described is an operation process of this configuration. This card-type wireless communication apparatus performs two-level switching-over by using an RSSI voltage in accordance with a distance from a host machine (e.g. an apparatus such an access point, a router or the like; or a transmitting box or the like). Operation of a controller 18 for this arrangement is explained below, referring to the flow chart of FIG. 14.

Firstly, the route switches 33 and 34 are initially set to select a route passing the low-noise amplifier 4. Next, the controller 18 monitors the direct current voltage (RSSI value) at the RSSI terminal of the baseband processing circuit 8. When the controller 18 detects (measures) the RSSI value, the controller 18 judges whether or not the RSSI value thus measured is lower than predetermined level (S51).

If an RSSI value is higher than a predetermined level at a moment when a linkage to the host machine is established, the controller 18 judges that the host machine is in a close distance (S52). In such case, the route passing the fixed attenuator 32a is selected by the route switches 33 and 34, which are controlled by whether an LNA_CTRL signal is supplied from the baseband processing circuit 8. Specifically, the controller 18 causes a generating section 18a to generate a first signal that is for controlling the switches 33 and 34 (S53), in order to switch over from a signal route of the low-noise amplifier 4 to a signal route of the a fixed attenuator 32a.

Here, the second switch 41, in accordance with the operation of the switches 33 and 34, is switched OFF so as to stop supply of power to the low-noise amplifier 4. In order to stop the supply of the power to the low-noise amplifier 4, the controller 18 causes the control section 18b to generate the second control signal that is for turning OFF the second switch 41 (S54).

On the other hand, if, at S51, the RSSI value thus measured is lower than the predetermined level, the controller 18 judges that the host machine is in a far distance (S55). In such case, according to whether the LNA_CTRL signal is supplied from the base and processing circuit 8, the switches 33 and 34 are switched to the low-noise amplifier 4 so that a signal is amplified by the low-noise amplifier 4 and then sent to a LPF 5, which is a next stage receptor circuit. Specifically, the controller 18 causes the generating section 18b to generate the first control signal that is for controlling the switches 33 and 34 (S56), in order to switch over from the signal route of the fixed attenuator 32a to the signal route or the low-noise amplifier 4.

Here, the second switch 41 is turned ON in accordance with the switching-over of the switches 33 and 34 so that the low-noise amplifier 4 is supplied with power from the power supply and is activated for the amplification of the signal. In order to allow the supply if the power to the low-noise amplifier 4, the controller 18 causes the control section 18b to generate the second control signal that turns ON the second switch 41 (S57).

Note that the present embodiment may be so arranged that the switching-over of the switches 33 and 34, and the turning ON/OFF of the second switch 41 can be manually switched over/turned ON/OFF forcibly by a user of the communication apparatus, the switching-over of the switches 33 and 34, and the turning ON/OFF of the second switch 41 operating in concert. For example, this arrangement allows selecting of the signal route of the fixed attenuator 32a in such a situation that the user prefers power-saving communication because a battery of the communication apparatus is running out.

The invention described in this embodiment 5 is so arranged that the low-noise amplifier 4 for reception, the fixed attenuator 32a, and the route switches 33 and 34 for controlling the low-noise amplifier 4 and the route passing the fixed attenuator 32a are provided in a high frequency amplification stage of a receptor circuit block, and the route switches 33 and 34 are used for selecting one of the low-noise amplifier 4 and the route passing the fixed attenuator 32a by switching over in accordance with a level of the high frequency input signal (RSSI) inputted into a reception block, the level varied depending on the distance from a communication counterpart, such as the host machine (e.g. an apparatus such as an access point, a router or the like; or a transmitting box or the like). The selected one of the low-noise amplifier 4 and the fixed attenuator 32a becomes part of a close circuit.

Thus, this embodiment brings about the same effects of the embodiment 4; that is, "an improvement of a battery duration" and "energy-saving design". Further, this embodiment attains the following effect: When the distance between the communication apparatus and the host machine is sufficiently close so that the fixed attenuator 32a is automatically selected, if the distance was excessively close, a distortion property would be deteriorated thereby deteriorating reception sensitivity. With this arrangement of embodiment 5, it is possible to perform the communication in a closer distance (range), because an attenuation amount of the fixed attenuator 32a improves the distortion property.

Reception sensitivity of the communication apparatus is deteriorated when the distance between the communication apparatus and the host machine. This is because, due to characteristic of a transistor and a diode which they use, distortion factor in the switch (TX/RXSW) 3, the low-noise amplifier 4, the U/D converter, and the like is deteriorated when a strength of an input is excessively large.

Embodiment 6

FIG. 7 is a block diagram showing a high frequency circuit section in a wireless communication apparatus of still yet another embodiment according to the present invention. The high frequency circuit section in FIG. 7 is modified from that of FIG. 5 as follows. A main part of the high frequency circuit section includes a low-noise amplifier 4 for transmission, and a variable attenuator 32b (provided instead of a bypass route 32 shown in FIG. 5), and route switches 33 and 34 for switching over routes of a reception signal. Note that a second switch 41 is provided between the low-noise amplifier 4, and a power supply 40 for supplying power to the low-noise amplifier 4. The second switch 41 turns ON and OFF in accordance with a second control signal generated by a control section 18b.

Figure 15:
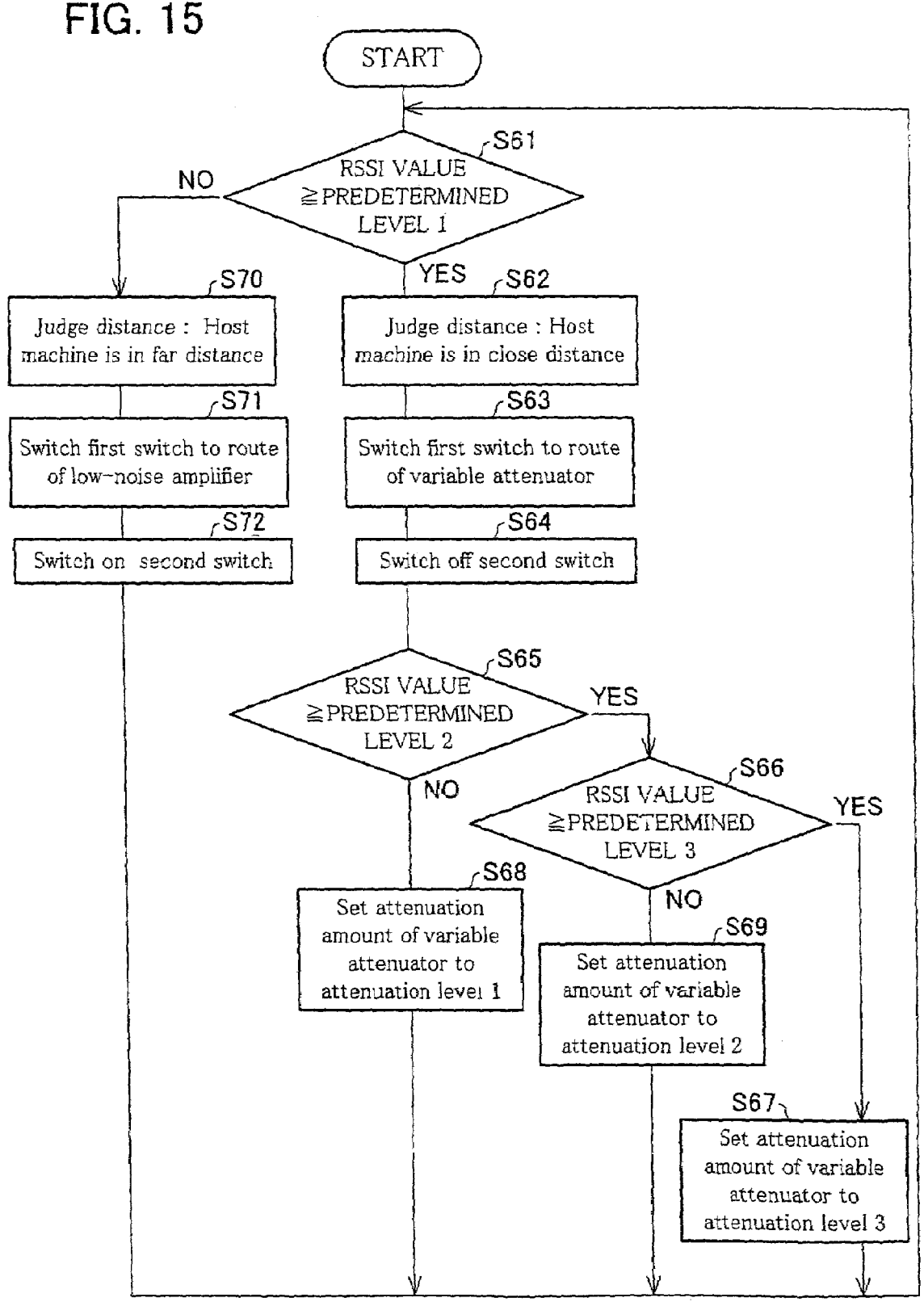
FIG. 15 is a flow chart showing how, in a receiving end, (a) switching-over between a low-noise amplifier and a variable attenuator, (b) switching-over of an attenuation amount of the variable attenuator, and (c) supply of power to the low-noise amplifier, are controlled in accordance with an RSSI value.

Next described is an operation process of this configuration. The card-type wireless communication apparatus performs delicate switching-over by using an RSSI voltage in accordance with a distance from a host machine (e.g. an apparatus such an access point, a router or the like; or a transmitting box or the like). Operation of a controller 18 for this arrangement is explained below, referring to the flow chart of FIG. 15.

Firstly, the controller 18 monitors the direct current voltage (RSSI value) at the RSSI terminal of the baseband processing circuit 8. When the controller 18 detects (measures) the RSSI value, the controller 18 judges whether or not the RSSI value thus measured is lower than a predetermined level (S61).

If an RSSI value is higher than a predetermined level 1, the controller 18 judges that the host machine is in a close distance (S62). In such case the variable attenuator 32*b* is selected by the route switches 33 and 34, which are controlled by whether or not an LNA_CTRL signal is supplied from the baseband processing circuit 8. Specifically, the controller 18 causes a generating section 18*a* to generate a first control signal that is for controlling the switches 33 and 34, in order to switch over from a signal route of the amplifier 4 to a signal route of a variable attenuator 32*b* (S63).

Here, the second switch 41 is turned OFF in accordance with the switching-over of the route switches 33 and 34, so as to stop supply of power to the low-noise amplifier 4. In order to stop the supply of the supply of the power to the low-noise amplifier 4, the controller 18 causes the controller 18 *b* to generate the second control signal that turns OFF the second switch 41 (S64).

Next, by using the base band processing circuit 8, it is adjusted such that the attenuation amount is divided into levels according to a limit of resolution of a D/A converter (which is of 4 bit for example), depending on a level of the electric wave that changes according to the distance from the host machine. (For example, if using 4-bit D/A converter, and 40 dB is a total amount that can be attenuated, the attenuation amount per level is 2.5 dB)

For example, the controller 18 judges whether or not the RSSI value thus measured is lower than a predetermined level 2, which is higher than the predetermined level 1 (S65). If the RSSI value thus measured is equal to or higher than the predetermined value 2, the controller 18 further judges whether the RSSI value thus measured is lower than a predetermined value 3, which is higher than a predetermined value 2 (S66). Here, assuming that the predetermined value 3 is the highest among the multileveled threshold values, the controller 18 sets the attenuation amount of the variable attenuator 22*b* to an attenuation level 3 (maximum attenuation amount) by using an D/A converter, if the RSSI value is equal to or higher than the predetermined level 3 (S67).

On the other hand, if, at S65, the RSSI value thus measured is less than the predetermined level 2, the attenuation amount of the variable attenuator 22*b* is set to an attenuation level (minimum attenuation amount) that corresponds to the predetermined level 1 (S68). Further, if, at S66, the RSSI value thus measured is less than the predetermined level 3, the attenuation amount of the variable attenuator 22*b* is set to an attenuation level 2 that corresponds to the predetermined level 2 (S69).

Note that the predetermined levels 1 to 3 to be compared with the RSSI value, and the attenuation levels 1 to 3, which respectively correspond to the predetermined levels 1 to 3, are stored in a memory (such as a look-up table or the like), which the controller 18 can access.

On the other hand, if, at S61, the RSSI value is lower than the predetermined level 1, the controller 18 judges that the host machine is in a far distance (S70). In such case, to amplify the signal by the low-noise amplifier 4 before sending the signal to a LPF 5, which is a next-stage receiver circuit, the low-noise amplifier 4 is selected by the route switches 33 and 34, according to whether or not the LNA_CTRL signal is supplied from the baseband processing circuit 8. Specifically, the controller 18 causes a generating section 18*a* to generate a first control signal that is for controlling the switches 33 and 34 (S71), in order to switch over from a signal route of the variable attenuator 32*b* to a signal route of the low-noise amplifier 4.

Here, the second switch is switched ON in accordance with the switching-over of the route switches 33 and 34, so that the low-noise amplifier 4 is supplied with power and is activated for the amplification of the signal. In order to allow the supply of the power to the low-pass amplifier 4, the controller 18 causes the control section 18*b* to generate the second control signal that turns ON the second switch 41 (S72).

Note that the present embodiment may be so arranged that a user of the communication apparatus can switch over the switches 23 and 24, and turn ON/OFF the second switch 41 manually and forcibly, the switches 23 and 24, and the second switch 41 operating (switching over/turning ON/OFF) in concert. For example, this arrangement allows selecting of the signal route of the variable attenuator 32*b* in such a situation that the user prefers power-saving communication because a battery of the communication apparatus is running out.

This embodiment 6 is so arranged that the low-noise amplifier 4 for reception, the variable attenuator 32*b*, and the route switches 33 and 34 for switching over the low-noise amplifier 4 and the variable attenuator 32*b* are provided in a high frequency amplification stage of a receptor circuit block, and the route switches 33 and 34 is used for selecting one of the low-noise amplifier 4 and the variable attenuator 32*b*, by switching over in accordance with a level of the high frequency input signal (RSSI) inputted into a reception block, the level varied depending on the distance from a communication counterpart, such as the host machine (e.g. an apparatus such an access point, a router or the like; or a transmitting box or the like). In this arrangement, the selected one of the low-noise amplifier 4 and the variable attenuator 32*b* becomes part of a close circuit.

Thus, this embodiment brings about the same effects of the embodiment 4; that is, "an improvement of a battery duration" and "energy-saving design". Further, this embodiment attains the following effect: When the distance from the host machine is sufficiently close so that the variable attenuator 32*b* is automatically selected, if the distance was excessively close, a distortion property would be deteriorated thereby deteriorating reception sensitivity. With this arrangement of embodiment 5, it is possible to perform the communication in a closer distance (range) more flexibly and more conveniently than the invention of embodiment 5, because an attenuation mount of the variable attenuator 32*b* is varied (adjusted) in accordance with the level of the high frequency input signal (RSSI).

For example, the use of the variable attenuator 32*b* allows finer mode selection (high attenuation amount/medium attenuation amount/low attenuation amount/no attenuation amount/switching-over to the low-noise amplifier) than two-mode selection (attenuation (1)/no attenuation (0)). Therefore, even if the level of the high-frequency input signal (RSSI) is abruptly changed, it is possible to adjust the reception sensitivity to its more optimum sensitivity suitable for a communication distance of a moment, compared with the two-mode selection. In the two-mode selection, attenuation amount would be inevitably reduced to 0 in case of abrupt change in the level of the high frequency input signal (RSSI) (for example, in case where the optimum attenuation amount was changed to 30 dB to 20 dB when communication is performed with a communication distance which requires an attenuation amount of 30 dB under ordinary circumstances, attenuation amount would be inevitably reduced to 0 in the two-mode selection in which attenuation of 30 dB or no attenuation is selected). As a result, the communication distance between the communication apparatus and the host machine would be too "short". This leads to deterioration of the reception sensitivity due to distortion, and increases in occurrence of reception errors.

On the other hand, the use of the variable attenuator 32b allows setting of the attenuation amount to its optimum amount suitable for the communication state and communication distance of the moment, thereby making it possible to suppress the deterioration of the reception sensitivity and the increase in the occurrence of the reception errors.

Because of the use of the variable attenuator 32b, this embodiment 6 is effective, particularly to a device such as a PDA, a mobile phone and the like, which may be used for communication in which the distance from the host machine constantly changes.

A wireless communication apparatus of the present invention, which is a card-type wireless communication apparatus to be connected with an information terminal device or built-in type module to be built in an information terminal device, includes: (i) an antenna; (ii) a receiver circuit section for demodulating a high frequency signal received by the antenna and converting a frequency of the high frequency signal, and for outputting a baseband receiving signal; (iii) a transmitter circuit section for modulating a baseband transmission signal and converting a frequency of the baseband transmission signal, and for outputting the high frequency signal to the antenna; (iv) a baseband signal processing circuit section for conducting a signal processing to the baseband transmission signal and the baseband receiving signal; (v) an interface circuit section having an interface function with an information terminal device; (vi) a power supply for sup plying power to each of the circuit sections; and (vii) a connector for connecting with the information terminal device.

The wireless communication apparatus according to the present invention is further arranged such that a high frequency amplification stage of a transmitter circuit block includes a transmission power amplifier, a bypass circuit, a switching circuit for selecting the transmission power amplifier and a bypass circuit, the switching circuit being switched over in accordance with a level of the high frequency input signal inputted into the reception block, so as to form a close circuit with the power amplifier or the bypass circuit selectively, the level of the high frequency input signal depending on a distance from a host machine (an apparatus such an access point, a router or the like; or a transmitting box or the like).

The wireless communication apparatus may be so arranged that a high frequency amplification circuit stage of a transmitter circuit block has (i) a power amplifier for transmitting; (ii) a fixed attenuator; and (iii) a switching circuit for selecting one of the route passing the power amplifier and a route passing the fixed attenuator, the switching circuit being switched over in accordance with a level of the high frequency input signal inputted into the reception block, so as to form a close circuit with the power amplifier or the fixed attenuator selectively, the level of the high frequency input signal depending on a distance from a host machine (an apparatus such an access point, a router or the like; or a transmitting box or the like).

The wireless communication apparatus may be so arranged that a high frequency amplification stage of the transmitter circuit block has (i) the power amplifier for transmitting; (ii) a variable attenuator; and (iii) the switching circuit for selecting the power amplifier and a route passing the variable attenuator, the switching circuit being switched over in accordance with a level of the high frequency input signal inputted into the reception block, so as to form a close circuit with the power amplifier or the variable attenuator selectively, the level of the high frequency input signal depending on a distance from a host machine (an apparatus such as an access point, a router or the like; or a transmitting box or the like).

The wireless communication apparatus may be so arranged that a high frequency amplification stage of the receptor circuit block has (i) a low-noise amplifier; (ii) the bypass route; and (iii) the switching circuit for selecting one of the route passing the power amplifier and the bypass route, the switching circuit being switched over in accordance with a level of the high frequency input signal inputted into the reception block, so as to form a close circuit with the bypass route or the low-noise amplifier selectively, the level of the high frequency input signal depending on a distance from a host machine (an apparatus such an access point, a router or the like; or a transmitting box or the like).

The wireless communication apparatus may be so arranged that a high frequency amplification stage of the receptor circuit block has (i) a low-noise amplifier; (ii) a fixed attenuator; and (iii) the switching circuit for selecting one of the route passing the power amplifier and the route passing the fixed attenuator, the switching circuit being switched over in accordance with a level of the high frequency input signal inputted into the reception block, so as to form a close circuit with the low-noise amplifier or a fixed attenuator selectively, the level of the high frequency input signal depending on a distance from a host machine (an apparatus such an access point, a router or the like; or a transmitting box or the like).

The wireless communication apparatus may be so arranged that a high frequency amplification stage of the receptor circuit block has (i) a low-noise amplifier; (ii) a variable attenuator; and (iii) the switching circuit for selecting one of the route passing the power amplifier and the route passing the fixed attenuator, the switching circuit being switched over in accordance with a level of the high frequency input signal inputted into the reception block, so as to form a close circuit with the low-noise amplifier or a variable attenuator selectively, the level of the high frequency input signal depending on a distance from a host machine (an apparatus such an access point, a router or the like; or a transmitting box or the like).

Taking the embodiment 1 as an example, the following describes setting of a threshold of the communication distance, which corresponds with the RSSI value: to which level the threshold value is set. The following refers to FIG. 8 in which simulation data are shown. Specifically, FIGS. 8(a) to 8(f) are tables of simulation results, showing a relationship between communication ranges and provision of the power amplifier for transmission.

Conditions for a simulation regarding a communication distance (reachable distance) between the host machine and the client are as follows.

Supposing that a signal route has no obstacles; an ideal isotropic transmitting antenna and an ideal isotropic receiving antenna are respectively set within a range of sight (sight distance); and only an electric wave directly transmitting between these antennas (direct wave) is used. A value of received voltage (Pr) captured from a transmitted voltage (Pt) is dependent only on a distance between the antennas (d), and on a wavelength (λ) of a frequency in use; thus, Pr is calculated in formulas below:

$$Pr=Pt\times(\lambda/4\pi d)=Pt/(4\pi d/\lambda)^2 \qquad (1),$$

$$Pr=Pt\times(\lambda/4\pi d)^{2.5}=Pt/(4\pi d/\lambda)^{2.5} \qquad (2),$$

$$Pr=Pt\times(\lambda/4\pi d)^3=Pt/(4\pi d/\lambda)^3 \qquad (3).$$

Thus, $(4\pi d/\lambda)^2$ or $^{2.5}$ or $^3$=Pt/Pr=Lp.

Note that Lp is so-called free space transmission loss.

A power law 2 of a formula (1) indicates an ideal free space. A 2.5th power law of a formula (2), indicating conditions of a space (environment) in general use, is a generally used exponent deriving from empirical rules. A power 3 of a formula (3) is a power based on a supposition of an office space (environment) in which desks, lockers, and people are frequently moving.

Note that, in actually designing the communication apparatus, one of the formulas 1 to 3 is selected according to which one of the power laws (2nd, 2.5th, 3rd power laws) the communication environment is approximate to.

Where directive gain (absolute gain (dBi)) of the transmitting antenna and the receiving antenna are respectively Gt and Gr, the free space transmission loss is calculated as follows:

$$Pr=Pt*Gt*(1/Lp)*Gr,$$

and the free space transmission loss is expressed in decibel as follows:

$$Pr(dBm)=Pt(dBm)+Gt(dB)-10\log Lp+Gr(dB).$$

The tables in FIG. 8 are programmed to perform spreadsheet-using calculation of the distance (d) by using the converted formula.

According to FIG. 8(e) showing a result of the simulation with the 2.5th power law, representing a use in the general space, it is expected that there will be no problems for a communication taking place within a range of about 26 meters (at home communication). Therefore, in case of designing the communication apparatus for the communication environment that follows the 2.5th power law, the threshold value of the RSSI value is set to a value corresponding to the communication distance of about 26 meters. With this arrangement, the power amplifier for transmission is automatically turned OFF accordingly when the RSSI value is equal to or higher than the threshold value, according to the present invention.

Further, when recognizing that there distance has become farther than about 26 meters by the RSSI (that is, when the RSSI value is lower than the threshold value), the power amplifier 9 is automatically turned on. With such setting that signal passing through the power amplifier 9, the communication range is expanded up to about 107 meters as shown in FIG. 8(b).

Moreover, even for office environments in which many obstacle structures are packed jumblingly in space, it is expected, from a result of simulation with the third power law shown in FIG. 8(f), that there will be no problems for a communication that is taken place within a range of about 7 meters despite such harsh conditions. Therefore, for designing the communication apparatus for the communication environment following the third power law, the threshold value of the RSSI value is set to be a value suitable for the communication distance of about 7 meters. With this arrangement, the power amplifier for transmission in the present invention is automatically turned off accordingly when the RSSI value is equal to or higher than the threshold value, according to the present invention.

Further, when recognizing that the distance has become farther than about 7 meters by the RSSI, the power amplifier 9 is automatically turned on. With such setting that signal passing through the power amplifier 9, the communication range is expanded up to 22 meters as shown in FIG. 8(c).

A simulation data in FIG. 9 show the threshold setting of the foregoing embodiment 4 (turning ON and OFF of the low-noise amplifier 4 for reception). Specifically, FIGS. 9(a) to 9(f) are tables of the simulation results, showing a relationship between communication ranges and provision of the low-noise amplifier for reception. Conditions and calculations for the simulation are the same as that of the FIG. 8. Thus, description is omitted.

Embodiment 7

The following describes an example in which (a) a communication state is evaluated by using various signals generated by a communication protocol that sets a control method for transmission and reception of a communication apparatus, and a power amplifier 9 or a low-noise amplifier 4 is turned ON and OFF by using a result of the evaluation of the communication state.

Figure 16:
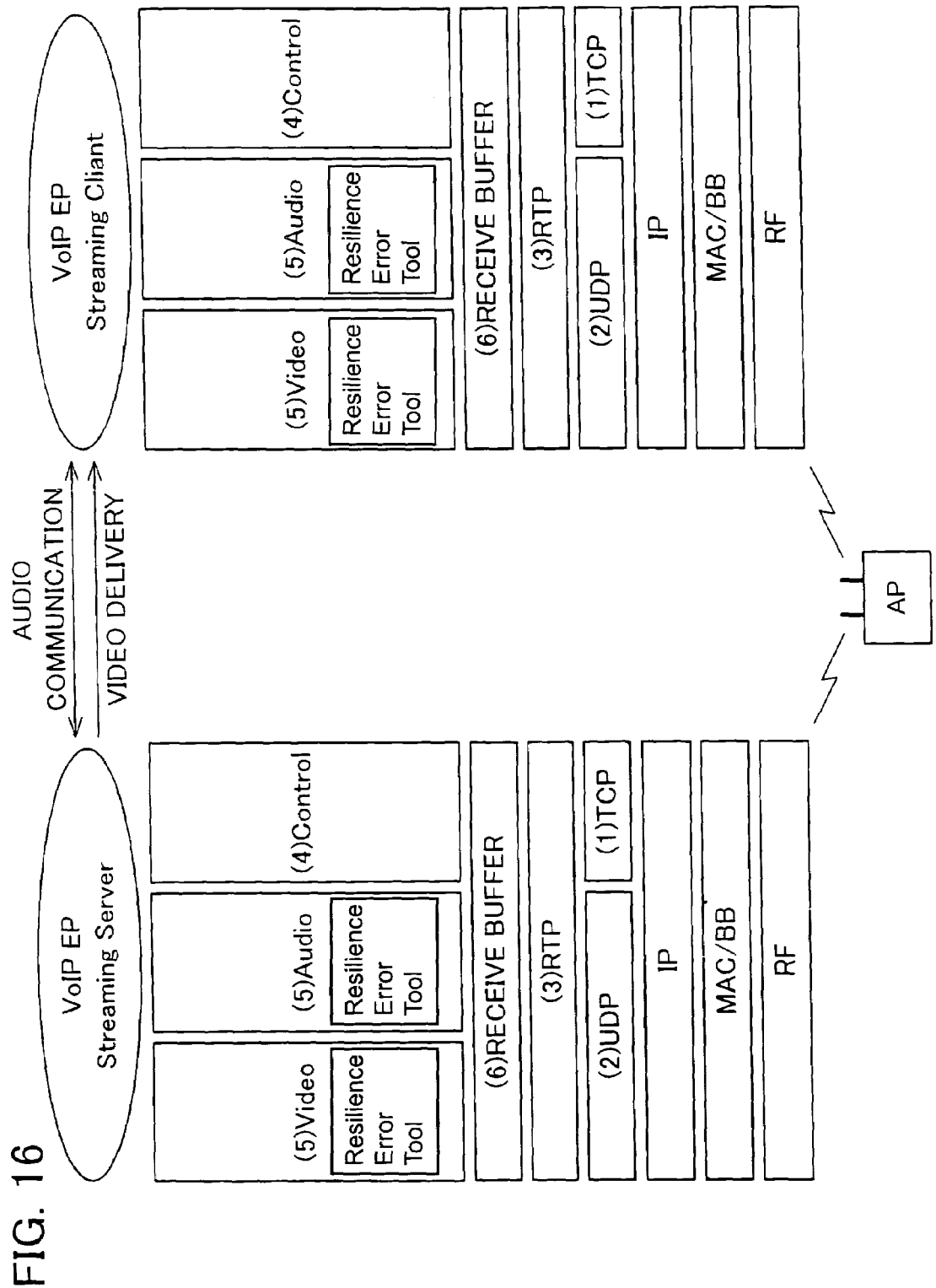
FIG. 16 is an explanatory view showing an arrangement of a server and a client, regarding communication protocol of wireless LAN.

FIG. 16 shows an arrangement of a server, a client, and a terminal (EP; End Point) regarding the protocol for executing an application for communication between the server and client via a wireless LAN (Local Area Network), such as voice communication, video delivery, and the like communication, which are performed between the server and client (for example in case of streaming later described), between terminals (EP) (for example, in case of VoIP later described).

Some of specific examples for such applications are streaming and VoIP (Voice over Internet Protocol).

The streaming and VoIP are applications for performing reproduction of multimedia data as receiving the multimedia data. Here, streaming refers to an application for one-way transmission of multimedia data from the server to the client, thereby distinguishing the streaming from the VoIP, which performs two-way communication. VoIP is an application for two-way communication on an IP network. VoIP is used for, for example, telephone (that is, two-way voice communication), and two-way communication of an image or voice, and the like two-way communication.

In the communication using the wireless LAN, the terminal (EP), the server, and the client have hierarchical structures in which they have 7 layers, as shown in FIG. 16.

A first layer (RF; Radio Frequency) is a physical layer and set a communication standard (for example, IEEE 802.11b) for actual wireless communication via an access point (AP).

A second layer (MAC/BB; Media Access Control/Back Baseband) is a data link layer and sets a protocol for transmitting and receiving data in a form of a packet.

A third layer (IP; Internet Protocol) is a network layer and sets a protocol for delivery of data from a computer to a computer.

A fourth layer (UDP/TCP; User Datagaram Protocol/Transmission Control Protocol) is a transport layer, and sets a protocol regarding control procedure for keeping high quality of communication so that all packets can be delivered to a communication counterpart without errors.

A fifth layer (RTP; Real Time Protocol) is a presentation layer, and sets a protocol regarding packet format for use in continuous data communication for video data or audio data.

A sixth layer (receive buffer) (reception buffer)) is a lower layer of an application layer. The sixth layer sets a protocol for temporal holding of the packets. After reception, the packets, which are formatted in accordance with RTP before their transmission, are temporally held for a certain number of packets, depending on which kind of application is used.

A seventh layer (video, audio, RTVP; Real Time Control Protocol) is an upper layer of the application layer, and sets a protocol regarding (a) interface process for decoding of the video data, audio data, the like data encoded in accordance with RTP, and (b) control process for defining relationship between terminals (communication apparatuses).

Figure 17:
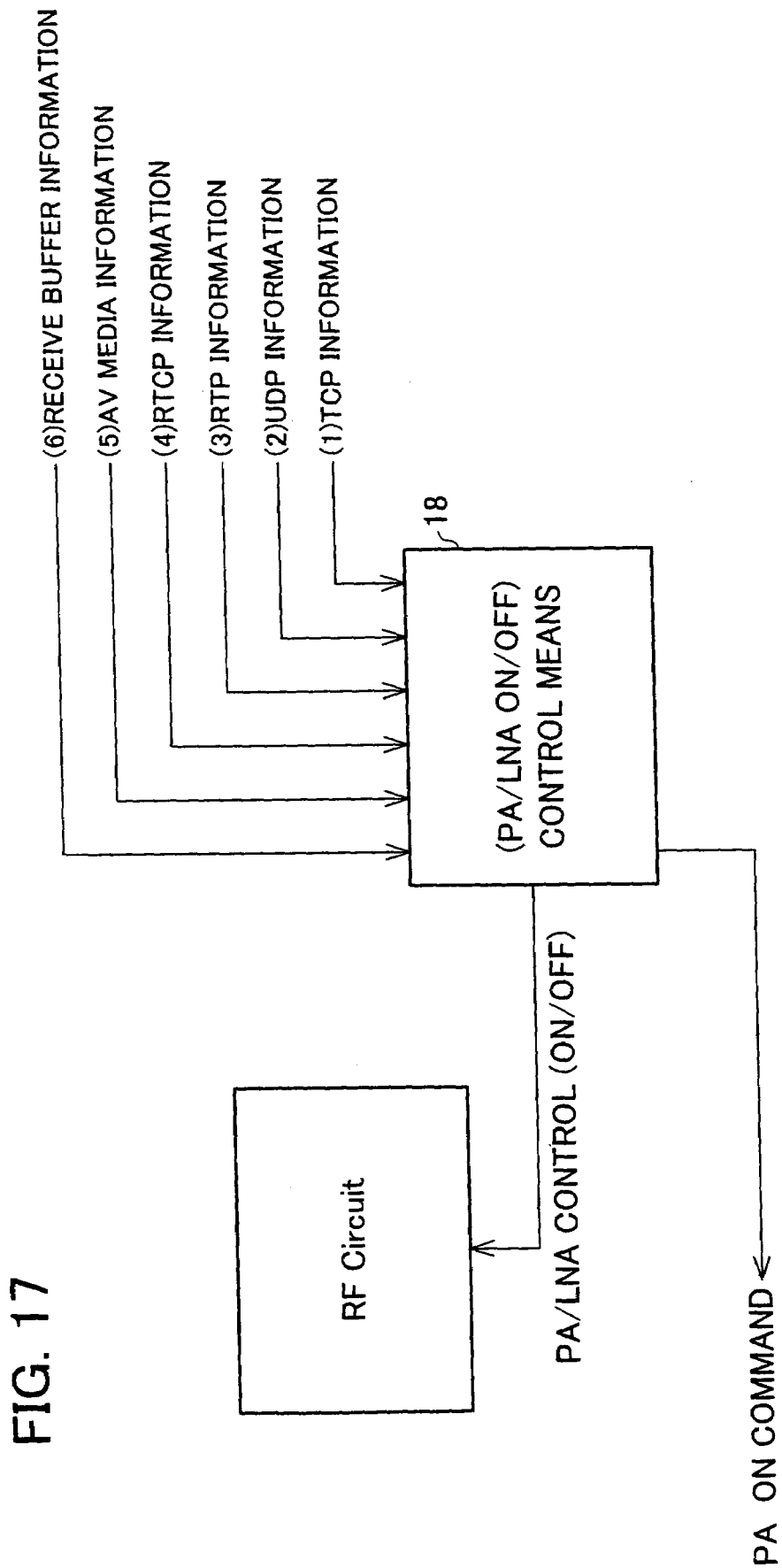
FIG. 17 is an explanatory view showing various information to be inputted into a control means for allowing and stopping the supply of power to the low-noise amplifier and the power amplifier.

FIG. 17 shows various information to be inputted into the controller 18 for stopping and allowing the power supply for the low-noise amplifier 4 and the power amplifier 9. The various information is obtained via data processing based on various protocol explained in FIG. 16. As later described, the various information regards condition of the communication (communication state) between the server and the client. By referring to the various information, the controller 18 causes the generating section 18a to generate the first control signal that is suitable for the communication state, and causes the control section 18b to generate the second control signal. The controller 18 sends the first and second control signals to an RF circuit section 43, which serves as a receptor circuit section and a transmitter circuit section, which include the low-noise amplifier 4 and the power amplifier 9.

With this arrangement, the controller 18 evaluates the evaluation of the communication state. According to a result of the evaluation performed by the controller 18, controlled is (I) the switching-over between the amplification route (in which the signal passes through the low-noise amplifier 4 or the power amplifier 9) and the bypass route 22 (321, and (ii) the turning ON/OFF of the low-noise amplifier 4 or the power amplifier 9 when the bypass route 22 (32) is selected.

The various information may be TCP information, UDP information, RTP information, RTCP information, A/V (audio/video) media information, and/or receive buffer information.

TCP information is generated by the data processing in accordance with TCP of the fourth layer. TCP is a protocol with which it is possible to confirm whether the data transmitted is correctly received by a counterpart communication apparatus. If the data is received correctly, the counterpart communication apparatus transmits ack (acknowledgement) information to a communication apparatus (transmission-performing communication apparatus) that transmitted the data. Thus, by receiving the ack information from the counterpart communication apparatus, the transmission-performing communication apparatus can confirm that the counterpart communication apparatus received the data correctly (without errors).

TCP is a protocol for repeating the transmission of the data until the reception of the ack information or until repeating the transmitting a predetermined time, if the ack information is not received by TCP within predetermined timeout period. Therefore, a threshold value may be set in terms of how many times the transmission is repeated, and the threshold value may be used to indicate how the communication state is. Moreover, the threshold value may be in multi levels.

UDP information is generated by the data processing in accordance with UDP of the fourth layer. UDP information is information showing a degree of errors in the data thus received. That is, the UDP information is generated by a process (checksum) for judging the degree of errors, the process executed by UDP. Note that UDP is a protocol for a simple communication procedure with which only the information necessary for communicating the data with the application layer is generated. In the present embodiment, the video data and the audio data are transmitted to a reception-performing communication apparatus in accordance with RTP and UDP described below,) the reception-performing communication apparatus being a communication apparatus receiving the data from its counterpart communication apparatus.

The UDP information may also be information indicative of two conditions regarding errors, that is, whether the data thus received has an error or not, or may also be information indicating how the condition is, by using a threshold, which may be multileveled.

The RTP information, which is generated by a data processing in accordance with RTP of the fifth layer, is information regarding (i) a number of packets to be transmitted by the transmission-performing communication apparatus (the number of packets following the packet containing that RTP information), and (ii) time (time stamp) at which the reception-performing communication apparatus is expected to receive the data (the packets). Because the RTP information is sent from the transmission-performing communication apparatus to the reception-performing communication apparatus, the reception-performing communication apparatus, the reception-performing communication apparatus can know which kind of data the reception-performing will received.

However, the reception-performing communication apparatus may ignore packets that are lost during the communication, and that are delivered behind time, and sequentially reproduce only packets that the reception-performing communication apparatus received within the time during witch the reception-performing communication apparatus is expected to receive the packets. The reception-performing communication apparatus may reproduce the packets that are delivered behind time, without processing the packets. In this regards, any arrangement may be adapted depending on the design of the application.

The RTCP information is information (SR; sender report) regarding communication state such as a degree of congestion in the network, a reception speed (rate) of the reception-performing communication counterpart, the number of packets of data to be transmitted from the moment by the transmission-performing communication apparatus, and the time during which the reception-performing communication apparatus is expected to receive the packets. The use of RTCP allows varying of the transmission speed (rate) and transmission amount of the multimedia data according to situation, whereas RTP dose not have such function.

The A/V media information is information or the like, which is generated by application of the seventh layer, and which is (i) the information such as the video data, audio data and/or the like, (ii) information regarding time in which the audio and/or video data is to be reproduced, (iii) information indicative of whether error-resilience tool (error corrector) operates or not, the error-resilience tool provided in a video CODEC (Compression and DECompressin) or an audio CODEC, and/or (iv) the like information. When an error (for example, part of the data is missing), is found, the error-resilience tool interpolates or corrects data having the error.

The receive buffer information is generated by the sixth layer and is information regarding time necessary for storing the data in a receive buffer, the data received by the reception-performing communication apparatus. Note that the receive buffer information will be described later.

Next, explained is the case where the controller 18 judges that the communication state is good, and the controller 18 thus causes the generating section 18*a* to generate the first control signal that is or causing the signal to bypass the low-noise amplifier or the power amplifier 9, and causes the control section 18*b* to generate the second control signal that is for stopping the supply of the power to the low-noise amplifier 4 and the power amplifier 9.

(1) Judgment Based on TCP Information

For the reception-performing communication apparatus, in case the reception-performing communication apparatus sends, to the transmission-performing communication apparatus, ack by TCP, but does not send nack (retransmission request) to the transmission-performing communication apparatus, the controller 18 of the reception-performing communication apparatus judges, based on such TCP information, that the communication state is good. Consequently, the controller 18 stops the supply of the power to the low-noise amplifier 4 by using the control section 18*b*.

On the other hand, for the transmission-performing communication apparatus, in case the transmission-performing communication apparatus does receives ack but not nack by TCP, the controller 18 of the transmission-performing communication apparatus judges, based on such TCP information, that the communication state is good. Consequently, the controller 18 stops the supply of the power to the power amplifier 9 by using the control section 18*b*.

(2) Judgment Based on UDP Information

In case where the checksum of UDP finds no error in the reception-performing communication apparatus, or finds that, in the reception-performing communication apparatus, the degree of the error is equal to or less than the threshold value, the controller 18 of the reception-performing communication apparatus judges, based on such UDP information, that the communication state is good. Consequently, the controller 18 of the reception-performing communication apparatus stops the supply of the power to the low-noise amplifier 4 by using the low-noise amplifier 4.

(3) Judgment Based on RTP Information and RTCP Information

In case where, in the reception-performing communication apparatus, comparison between the RTP information and SR of RTCP is performed and an actual reception state of the received data accords with forecasted reception state of data, the controller 18 of the reception-performing communication apparatus judges, based on such RTP information and RTCP information, that the communication is good. Consequently, the controller 18 of the reception-performing communication apparatus stops the supply of the power to the low-noise amplifier 4 by using the controller 18*b*.

Note that the RTP information is information obtained by finding out how many packets the reception-performing communication apparatus has received, how much byte the received packets are, how many packets the reception-performing communication apparatus received per second, and/or the like.

(4) Judgment Based on RTP Information and A/V Media Information

In case as a result of comparison between packet arrival time indicated (examined) by RTP and the A/V media information (the information regarding the time to reproduce (or decode) the data) received by the reception-performing communication end, the comparison found that the packet arrival time is earlier than the time to reproduce the data, the controller 18 of the reception-performing communication apparatus judges, based on such RTP information and A/V media information, that the communication state is good.

Consequently, the controller 18 of the reception-performing communication apparatus stops the supply of the power to the low-noise amplifier 4 by using the control section 18*b*. If the packet arrival time (time at which the packet is received) is earlier than the time to reproduce the data, this indicates that the reception-performing communication apparatus receives the data with sufficient time before the time to reproduce the data.

This point is explained more specifically below. For example, in case of the video signal, the video signal is sampled per 33 msec as unit of time unit, thereby forming coded data whose one frame has a period of 33 msec, as shown in FIG. 18(*a*), that is, the video signal is converted into the coded data v1, v2, v3, and v4, for example. Each frame has a header into which a time since the start time of the sampling is written.

In FIG. 18(*a*), the coded data v1 and the like are shown to have various data length. This is because, in case of the video data, a data amount varies time to time depending on type and nature of images: a still picture or a dynamic picture; a dynamic picture showing a very actively moving object or showing a rather motionless object.

Times (t, t+a, t+b, t+c) at which the coded data v1 and the like are transmitted from the server to the client are continuous. However, times at which the coded data v1 and the like are received by the client are not continuous. That is, the communication state between the server and client affects and changes the times at which the coded data v1 and the like are received by the client.

Because of this, as shown in FIG. 18(*a*), such a phenomenon possibly occurs that, for example, the data v1 is received by the client in time before time T at which the data v1 is to be reproduced, but the data v3 fails to be received in time before time T+2 at which the data v3 supposed to be reproduced.

Note that the client reads time information from the header of each frame, by using RTP, thereby grasping the times at which the frames are to be reproduced respectively.

FIG. 18(*b*) shows a case where the same treatment is done for the audio signal. In case of the audio signal, for example in AMR (adaptive multirate coder), coded data is prepared by sampling the audio signal per 20 sec as unit of time, thereby preparing coded data divide into frames of 20 sec. As in the video signal, each frame, has a header in which a time passed from the starting time of the sampling is written.

In case of the audio signal, the data amount to be coded with respect to the constant sampling time is basically constant. Thus, as shown in FIG. 18(*b*), coded data v'1, v'2, v'3, v'4 of the audio signal have the same data length. As to the transmission time and the time to reproduce the data, the same is true as in the case of the video signal.

(5) Judgment Based on A/V Media Information

In case where in the reception-performing communication apparatus the error-resilience tool provided in the video CODEC or the audio CODEC is not operated, the controller 18 of the reception-performing communication apparatus judges, based on such A/V media information, that the communication state is good. Consequently, the controller 18 of the reception-performing communication apparatus stops the supply of the power to the low-noise amplifier 4 by using the control section 18*b*.

The following discuses the opposite case, that is, in case where the controller 18 judges that the communication state is bad, and consequently allows the supply of the power to the low-amplifier 4 or the power-amplifier 9 by using the control section 18*b*.

(1) Judgment Based on TCP Information

For reception-performing communication apparatus, in case the reception-performing communication apparatus sends nack to the transmission-performing communication apparatus by TCP consequently an n number of times, the controller 18 of the communication apparatus judges, based on such TCP information, that the communication state is bad. Consequently, the controller 18 of the reception-performing communication apparatus allows the supply of the power to the low-noise amplifier 4 by using the control section 18*b*.

On the other hand, for the transmission-performing communication apparatus, if the transmission-performing communication apparatus receives nock from the reception-performing communication apparatus by TCP consequently the n number of times, the controller 18 of the transmission-performing communication apparatus may be so arranged to judge, based on such TCP information, that the communication state is bad, and consequently to allow the supply of the power to the power amplifier 9 by using the control section 18*b*.

Note that the example discussed above is merely an example. The judgment may be made referring to thresholds as to how many times nack occurs per unit of time, instead of how many times nack occurs sequentially. Alternatively, the threshold values as to (a) how many times nack occurs per unit of time, and (b) how many times nack occurs sequentially, may be set considering a relationship of the data length of the packet with (a) how many times nack occurs per unit of time, and (b) how many times nack occurs sequentially. (For example, the threshold is set larger, when the data length is long.)

(2) Judgment Based on UDP Information

In case where in the reception-performing communication apparatus the checksum of UDP found an error or found that the degree of errors exceeds the threshold value, the controller 18 of the reception-performing communication apparatus judges, based on such UDP information, that the communication state is bad. Consequently, the controller 18 allows the supply of the power to the low-amplifier 4 by using the control section 18*b*. Note that the threshold value may be set taking into consideration a relationship between the degree of errors and the data length of the packets.

(3) Judgment Based on RTP Information and RTCP Information

In case where, in the reception-performing communication apparatus, comparison between the RTP information and SR of RTCP is performed and found that an actual state of the received data does not accord with a forecasted state of the data (the forecasted state is notified before the signal is received), the controller 18 of the reception-performing communication apparatus judges, based on such RTP information and RTCP information, that the communication is bad. Consequently, the controller 18 of the reception-performing communication apparatus allows the supply of the power to the low-noise amplifier 4 by using the controller 18*b*.

(4) Judgment Based on RTP Information and A/V Media Information

In case as a result of comparison between packet arrival time indicated (examined) by RTP and the A/V media information (the information regarding the time to reproduce (or decode) the data) received by the reception-performing communication end, the comparison found that the packet arrival time arrived on or after the time to reproduce the data, the controller 18 of the reception-performing communication apparatus judges, based on such RTP information and A/V media information, that the communication state is bad. Consequently, the controller 18 of the reception-performing communication apparatus allows the supply of the power to the low-noise amplifier 4 by using the control section 18*b*.

(5) Judgment Based on A/V Media Information

In case where in the reception-performing communication apparatus the error-resilience tool provided in the video CODEC or the audio CODEC does operate, the controller 18 of the reception-performing communication apparatus judges, based on such A/V media information, that the communication state is bad. Consequently, the controller 18 of the reception-performing communication apparatus allows the supply of the power to the low-noise amplifier 4 by using the control section 18*b*.

For example, in the compressing coding method (which follows MPEG-4) for the video signal, the coded data is generated from the video signal in accordance with a certain protocol. It may be arranged that judgment as to whether or not the coded data has an error, is conducted by whether or not the error-resilience tool correctly detects error detection-use data when decoding the coded data, the error detection-use data following the certain protocol. If the error-resilience tool detects an error in the coded data as a result of the judgment, the error-resilience tool performs the error correction.

It may be arranged that the result of the judgment performed in the reception-performing communication apparatus as to whether the communication is good or bad, is reported to the transmission-performing communication apparatus, and the power amplifier 9 of the transmission-performing communication apparatus is turned ON and OFF in accordance with the result of the judgment performed in the reception-performing communication apparatus.

If, in the transmission-performing communication apparatus, it is impossible to detect that the communication is bad (so that the transmission-performing communication apparatus will turn OFF the power amplifier 9 voluntarily) but, the reception-performing communication apparatus detects that the communication state is bad, then, for example, the communication apparatuses performing the communication between each other carry out such control that the power is supplied to the low-noise amplifier 4 in the reception-performing communication apparatus, meanwhile the power-amplifier 9 of the transmission-performing communication apparatus is supplied with the power. As a result, in some cases, the communication becomes good synergistically.

On the contrary, in such a situation that the power amplifier 9 of the transmission-performing communication apparatus is turned ON because the RSSI is small, the communication apparatuses performing the communication between each other can carry out such control that the reception-performing communication apparatus, which detects that the communication state is good, reports to the transmission-performing communication apparatus that the communication state is good, and the supply of the power is stopped not only to the low-noise amplifier 4 of the reception-performing communication apparatus, but also to the power-amplifier 9 of the transmission-performing communication apparatus. This results in synergistic effect to save communication consumption of both the communication apparatus.

(6) Judgment Unique in Streaming and VoIP

Next, the control for turning ON and OFF is described below, which is unique in the applications of the streaming and VoIP. The turning ON and OFF of the power supply (whether the supply of the power is stopped or allowed) is controlled differently in the applications because the receive buffer is used in different ways in the applications.

To begin with, in the streaming, in which the data is one-way transmitted from the server to the client, the use does not recognizes retention of the data in the receive buffer in the client, even if data is retained in the receive buffer to some extent. This is because, regardless of whether or not the data is retained in the receive buffer, the user merely senses (sees and/or hears) the data that is sent out of the receive buffer and reproduced. Actually, a reproduction that is more natural can be attained by reproducing the data that is transmitted to the application after being retained in the receive buffer to some extent, because the communication speed (rate) varies time to time depending on the condition of the network.

The client receives, from the server, information regarding bit rate (T) and necessary buffer size (b) of the data that is to be transmitted from the server. By doing this, the time (buffer-full time t) necessary to store the data in the receive buffer can be found by the client by using a formula of t=B/T (sec). The judgment whether the communication state is good or bad is carried out by the comparison performed by the controller 18 to compare between (a) the buffer-full time obtained from the calculation and (b) time t', which is an actual time taken to store the data in the receive buffer, the data received (t and t' correspond to the receive buffer information). Specifically, in the buffering process carried out by the client, when t'≦t, the controller 18 judges that the communication is good. Consequently, the controller 18 stops the supply of the power to the low-noise amplifier 4 by using the control section 18b.

On the other hand, in the buffering process of the client, when t'>t, the controller 18 judges that the communication state becomes bad. Consequently, the controller 18 allows the supply of the power to the low-noise amplifier 4 by using the con roller 18. Moreover, in the streaming, if the receive buffer becomes empty during the reception of data, this indicates that the reception of data is behind time. Thus, the controller 18 judges that the communication becomes bad. Consequently, the controller 18 allows the supply of the power to the low-noise amplifier 4 by using the control section 18b.

Note that the buffer size (B) that the server requests the client varies depending on how much the contents is. Therefore, the buffer size (B) is inconstant. Moreover, the bit rate (T) also varies depending on how much a communication line is crowded. In the client, when a scheduled data amount is retained the receive buffer, the data is sent from the receive buffer to the application, so that the reproduction of the data is started.

The receive buffer has a memory cap city larger than the buffer size (B). Thus, it is possible to retain the received data in the receive buffer even if a data amount inputted into the receive buffer exceeds a data amount outputted from the receive buffer. Moreover, it is possible for the server to grasp the size of the receive buffer of the client, and a data amount that can be transmitted to the client.

Next, in VoIP, conversation is established by the two-way audio communication between the server and the client or between the communications apparatuses. Thus, VoIP is so arranged that VoIP does not allow delay in the reception of the audio data basically. Therefore, no buffering process is carried out in VoIP, unlike the streaming.

In VoIP, if the reception-performing communication apparatus can decode the audio data continuously during the conversation, the controller 18 receives the A/V media information notifying this state. Hereby, the controller 18 judges that the communication state is good. Consequently, the controller 18 stops the supply of the power to the low-noise amplifier 4 by using the control section 18b.

On the other hand, if the decoding of the audio data is stopped during the conversation, the controller 18 receives the A/V media information notifying this state. Hereby, the controller 18 judges that the communication state becomes bad. Consequently, the controller 18 allows the supply of the power to the low-noise amplifier 4 by using the control section 18b.

Note that, if the conversation is paused, the audio CODEC detects that no audio input is inputted. Consequently, the audio CODEC generates no-voice information and sends it to the counterpart communication apparatus. Thus, the decoding of the audio data is kept to be continuous.

So far, described is how to carry out by the controller 18 the judgment as to whether the communication state is good or bad, by using the various signals generated by the communication protocol. In the above, the process of the judgment is divided into the judgments (1) to (6). The following explains an order of carrying out the judgments (1) to (6), and collateral condition to the judgments (1) to (6) in order to stop or allow the supply of the power to the low-noise amplifier 4.

The judgments (1) to (6) are carried out in this order (their numbering). This order is the same as an order in which the judgments are carried out in accordance with the communication protocol. Therefore, in the order of from (1) to (6), the controller 18 carries the judgment as to whether the communication state is good or bad.

For the first method in which the supply of the power to the low-noise amplifier 4 is allowed if the collateral condition is satisfied, the collateral condition is that if any one of the judgments (1) to (6) showed at least one phenomenon indicating that the communication state is bad, the controller 18 would judge that the communication state is bad, and allow the supply of the power to the low-noise amplifier 4 by using the control section 18b.

Moreover, for the second method in which the supply of the power of the low-noise amplifier 4 is allowed if the collateral condition is satisfied, its collateral conditions are (a) that if any one of the judgments (1) to (4) showed at least one phenomenon indicating that the communication state is bad, the controller 18 would judge that the communication state is bad, and allow the supply of the power to the low-noise amplifier 4 by using the control section 18b, and (b) that for the judgment (5) and (6), the phenomenon indicating that the communication state is bad is tolerated until it occurs n times, which is a threshold for the allowance of the phenomenon, and if the phenomenon occurs n times, the controller 18 would judge that communication state is bad, and would allow the supply of the power to the low-noise amplifier 4 by using the control section 18b.

Note that in the second method, the judgments (1) to (4) are not limited to such arrangement that the controller 18 judges that the communication state is bad if the phenomenon occurs at least one time. That is, it may be so arranged as to set threshold values to the judgments (1) to (6) respectively as to the tolerance as to how many number of times the phenomenon is tolerated to occur, as long as the threshold values do not adversely affect the reliability of the communication.

Moreover, as to the threshold of n times, such collateral condition may be set that if the phenomenon occurred continuously, or if the phenomenon occurred within a predetermined time interval, the controller 18 would judge that the communication state is bad.

Further, for the first method in which the supply of the power to the low-noise amplifier 4 is stopped if the collateral condition is satisfied, the controller 18 would judge that the communication state is good, if in all of the judgments (1) to (6) the phenomenon indicating the communication state is bad did not occur. Consequently, the controller 18 would stop the supply of the power to the low-noise amplifier 4 by using the control section 18*b*.

Further, for the second method in which the supply of the power of the low-noise amplifier 4 is stopped if the collateral condition is satisfied, the controller 18 would judge that the communication state is good, if in the judgments (1) to (4) the phenomenon did not occur. Then, for time being, the controller 18 would stop the supply of the power to the low-noise amplifier 4. The controller 18 counts the number of the times the phenomenon occurs as to the judgments (5) and (6). If the occurrence of the phenomenon is counted up to the threshold value for any one of the judgments (5) and (6), the controller 18 judges that the communication state becomes bad. Consequently, the controller 18 allows the supply of the power to the low-noise amplifier 4 by using the control section 18*b*.

Further, for the third method in which the supply of the power to the low-noise amplifier 4 is stopped if the collateral condition is satisfied, the threshold values for the judgments (1) to (6) are respectively set as to the tolerance as to how many number of times the phenomenon is tolerated to occur, as long as the threshold values do not adversely affect the reliability of the communication. Until at least one of the thresholds is exceeded by the number of times the phenomenon occurs, the controller 18 judges that the communication is good. So, the controller 18 stops the supply of the power to the low-noise amplifier 4 by using the control section 18*b*.

Hereinafter, other characteristics of the present invention are listed below.

(1) It is preferable that, in the wireless communication circuit, a control means (controller) controls switching-over of the first switch in accordance with a strength of a reception signal.

Therefore, it is possible to appropriately judge the distance between the apparatuses performing the wireless communication, and to switch over to the bypass route timely when the distance is short. Thereby, it is possible to attain that the communication can be continued longer time without recharging the battery. Furthermore, the wireless communication can be surely performed with lower power consumption.

(2) It is preferable that, in the wireless communication circuit, the control means (controller) includes a generating section for generating a first control signal that is for controlling the switching over of the first switch, in accordance with a received signal strength indicator, which is the strength of the reception signal.

With this arrangement, it is possible to attain a simpler circuit configuration by using the RSSI, which is normally provided in a digital signal processing circuit, such as a baseband signal processing circuit section.

(3) It is preferable that the wireless communication circuit further comprises a second switch or allowing and stopping supply of power to the amplifier, the control means (controller) having a control section for generating a second control signal that is for controlling the second switch in concert with the switching-over of the first switch.

With this arrangement, it is possible to stop the supply of the power to the amplifier by using the second switch, when the bypass route is select ed. Thus, it is possible to reduce the power consumption, thereby prolonging the duration of the battery.

(4) The wireless communication circuit may comprise a fixed attenuator on the bypass route. The wireless communication circuit may comprise a variable attenuator on the bypass route.

When the distance from the host machine is so short, the distortion is deteriorated and the sensitivity is reduced. This arrangement not only attains the "improvement of a battery duration" and "energy-saving design", but also allows the communication apparatus to be communicatable in a more vicinity of the host machine by improving the distortion by the attenuation amount of the (fixed or variable) attenuator when the route in which the signal passes the attenuator is selected. Further, the arrangement in which the variable attenuator is provided is more advantageous for communication that is carried out while location is changing (eg. by a user who is walking) time to time, such as communications carried out with PDA, portable phone or the like.

Furthermore, for the case where a large number of communication apparatuses perform communication at once within a certain area (such as wireless LAN), the arrangement in which the bypass route includes the fixed attenuator or the variable attenuator is more advantageous because it is possible to reduce the output of the transmission signals from each of the communication counterparts when they are in a close distance. Further, it is possible to suppress occupying communication band used by other wireless communication apparatus, or interfering communication by other wireless communication apparatus.

(5) The wireless communication circuit may be so arranged that the amplifier is a power amplifier for amplifying a transmission signal that is to be sent to the antenna. The wireless communication circuit may be so arranged that the amplifier is a low-noise amplifier for amplifying a reception signal received via the antenna. With this arrangement, "an improvement of a battery durability" and "an energy-saving design" can be achieved. Especially, in case of the power amplifier, those can be attained to a large extent with certainty.

(6) A wireless communication circuit of the present invention, including an amplifier for amplifying a signal, the wireless communication circuit comprising: an amplification route in which the signal passes through the amplifier; a bypass route for bypassing the amplifier; and a route-selector for selecting one of the amplification route and the bypass route.

One of the objects of the present invention is to provide a wireless communication circuit that allows both (a) an apparatus in which the circuit is provided, and (b) a counter apparatus performing communication with the apparatus, to perform high-quality communication with low power consumption.

Moreover, an unamplified signal can be transmitted with less distortion and without disturbing other communication apparatuses. For better transmission and reception, it is possible to select by the bypass route by using the route-selector, in order that the communication may be carried out with the unamplified signal. In this case, because the amplifier is not used, the power consumption of the wireless communication circuit can be saved.

(7) It is preferable to arrange such that the route-selector selects one of the amplification route and the bypass route in accordance with a strength of the signal (signal strength) that the wireless communication circuit receives.

With this arrangement, it is possible to switch over between the amplification route and the bypass route, in accordance with the signal strength, which changes time to time depending on the communication distance and the communication environment (surrounding)

(8) It is preferable to arrange such that the route-selector selects the bypass route when the strength of the signal received is equal to or higher than a predetermined threshold value.

With this arrangement, when the strength of the signal received is equal to or higher than the predetermined threshold value, and thus there is no need of amplifying the strength of the reception signal, the bypass route is selected. Hence, it is possible to attain high-quality communication with low power consumption.

(9) It is preferable to arrange such that the route-selector has a control means (controller) for judging whether communication of the wireless communication circuit is good or bad, and for generating a first control signal that is for selecting one of the amplification route and the bypass route in accordance with a result of the judging.

With this arrangement, it is possible to switch over between the amplification route and the bypass route, taking into consideration various factors, which relate to the judgment of the communication state. That is, it is possible to attain delicate control of the power consumption by controlling the power consumption in accordance more various factors.

(10) It is arranged that the route selector has a control means (controller) for judging whether communication state of the wireless communication circuit is good or bad, and for generating a first control signal that is for selecting one of the amplification route and the bypass route in accordance with a result of the judging; and when the control means judges that the communication state is good even if a strength of the signal received is equal to or lower than a predetermined threshold value, the control means generates a first control signal that is for selecting the bypass route.

In the previous arrangements, when the strength of the signal is equal to or less than the threshold, the reception signal should be amplified in some cases because the reception signal received by the wireless communication circuit is weak. However, there is no problem with such weak reception signal, provided that the communication state is good. According to this arrangement, in which not only the strength of the reception signal is judged, but also the communication state is evaluated, it is possible to attain more effective control for realizing low power consumption.

(11) It is arranged that the route-selector has a control means (controller) for judging whether communication state of the wireless communication circuit is good or bad, and for generating a first control signal that is for selecting one of the amplification route and the bypass route in accordance with a result of the judging; and when the control means judges that the communication state is bad even if a strength of the signal received is equal to or higher than a predetermined threshold value, the control means generates a first control signal that is for selecting the amplification route.

In the previous arrangements, when the strength of the signal is equal to or higher than the threshold, application of the reception signal is unnecessary in some case because the reception signal received by the wireless communication circuit is strong. However, no high-quality communication can be attained if the communication state is bad. According to this arrangement, in which not only the strength of the reception signal is judged, but also the communication state is evaluated, it is possible to improve reliability of communication while taking the low power consumption into consideration.

(12) Note that the control means (controller) judges that the communication state is good, when:

(a) the control means (controller) analyzes contents of an information signal received from the counterpart communication apparatus, and judges an information signal as "ack" (appropriate reception acknowledgement);

(b) the control means (controller) detects the degree of errors in the reception data generated from the signal received by the wireless communication circuit, and the degree of error does not exceeds the threshold value;

(c) an actual reception state of reception data generated from a signal received by the wireless communication circuit, accords with a forecasted reception state of the reception data, the forecasted reception state being notified from a counterpart communication apparatus before the signal is received.

(d) (i) the control means (controller obtains a time information from reception data, which is generated from a signal received by the wireless communication circuit, the time information regarding a time at which application for the reception data is to be executed, (ii) the control means compares, with the time information, a time at which the reception data is received, and (iii) the control means judges that the reception data of the signal arrived before the time at which the application is to be executed;

(e) an error-resilience tool is no operated, the error-resilience tool provided in an application using reception data, which is generated from a signal received by the wireless communication circuit;

(f) $t' \leq t$, where the wireless communication circuit is provided with a receive buffer for temporally retaining reception data, and reception data generated from a signal received by the wireless communication circuit is streaming data, the control means (controller) receives information from a communication apparatus that is to transmit the reception data, the information regarding a bit rate of the reception data and a buffer size that is necessary for temporally retaining the reception data, the control means obtaining a buffer-full time t from the bit rate and the buffer size, the buffer-full time t being a time necessary for storing the reception data in the receive buffer, the control means comparing the buffer-full time t with a buffering time t', which is an actual time taken to store the reception data in the receive buffer;

(g) reception data generated from a signal received by a wireless communication circuit, in which the wireless communication circuit is provided, is continuously decoded, where the communication apparatus including the wireless communication circuit performs two-way communication with a counterpart communication apparatus; and the like conditions.

Therefore, while being executed, the application, which uses the reception data generated from the signal received by the wireless communication circuit, is monitored in terms of the various factors, as to whether the application is appropriately executed. When the application is appropriately executed, it is possible to select the low-power-consumption mode in which the bypass route is use. Further, by further taking into consideration the judgment as to the strength of the reception signal used for the judgment as to the communication state, it is possible to attain more effective control for realizing low power consumption Note that it may be arranged such that (h) the receive buffer becomes empty during reception of the reception data, the control means judges that the communication state is bad.

In this case, the emptiness of the receive buffer during the reception of the reception data indicates that the reception of the reception data is hindered. One of possible countermeasurements for the reception-performing communication apparatus is to amplify the strength of the reception signal by selecting the amplification route.

(13) Further, it may be arranged such that, regarding the conditions (a) to (i), a threshold value is set as to a number of times the control means judges that the communication state is bad, and while the number of times is less than or equal to the threshold value, the control means judges that the communication state is good.

With this arrangement, in which the threshold value can be set depending on how much reliability of communication is needed, it is possible to attain flexible control for realizing the low power consumption, while ensuring reliability of communication to some extent.

(14) Further, the wireless communication circuit of the present invention is so arranged as to include a power-supply stopper for stopping supply of power to the amplifier in concert with selecting of the bypass route by the route-selector.

With this arrangement, it is possible to further reduces the power consumption, and for example, to prolong the duration of the built-in battery, because the power-supply stopper for stopping supply of power to the amplifier in concert with selecting of the bypass route by the route-selector. Moreover, this arrangement prevents noise from mixing into the bypass route form the amplification route.

(15) A wireless communication circuit of the present invention having an amplifier for amplifying a signal, is so arranged as to comprise a communication-distance-detector for detecting a distance from a communication counterpart; and a route-selector for selecting, in accordance with the distance detected (found out) by the communication-distance-detector, one of (a) an amplification route in which the signal passes through the amplifier, and (b) a bypass route in which the signal bypasses the amplifier.

When the distance from the communication counterpart is short, the signal transmitted from the communication counterpart tends to be strong, whereas the signal transmitted from the communication counterpart tends to be weak. With this arrangement, it is possible to control the power consumption in accordance with the reception condition, by switching over between the amplification route and the bypass route in accordance with the thus detected distance.

Note that the communication-distance-detector may be provided with (a) a detector for detecting the strength of the reception signal, (b) a storage for storing data that associates the strength of the reception signal with the communication distance, and (c) a judgment section for judging, based on (by using) the data, a communication distance associated with the strength thus detected.

(16) It may be so arranged that the route-selector selects the bypass route, when the distance from the communication counterpart exceeds a predetermined value, the distance detected (found out) by the communication-distance-detector.

With this arrangement, it is possible to attain a similar effect as in the arrangement where the bypass route is selected when the strength of the signal is equal to or higher than a predetermined threshold value.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A wireless communication circuit including an amplifier for amplifying a signal, the wireless communication circuit comprising:
    an amplification route in which the signal passes through the amplifier;
    a bypass route for bypassing the amplifier; and
    a route-selector for selecting one of the amplification route and the bypass route, the route-selector comprising a controller for judging whether a communication state of the wireless communication circuit is good or bad, and for generating a first control signal that is for selecting one of the amplification route and the bypass route in accordance with a result of the judging,
    wherein when the wireless communication circuit receives no retransmission request from a counterpart communication apparatus to which the wireless communication circuit sent an information signal, the controller judges that the communication state is good.

2. The wireless communication circuit as set forth in claim 1 wherein:
    when the controller judges that the communication state is good even if a strength of the signal received is equal to or lower than a predetermined threshold value, the controller generates a first control signal that is for selecting the bypass route.

3. The wireless communication circuit as set forth in claim 2, comprising:
    a power-supply stopper for stopping supply of power to the amplifier in concert with selecting of the bypass route by the route-selector.

4. The wireless communication circuit as set forth in claim 1 wherein:
    when the controller judges that the communication state is bad even if a strength of the signal received is equal to or higher than a predetermined threshold value, the controller generates a first control signal that is for selecting the amplification route.

5. The wireless communication circuit as set forth in claim 4, comprising:
    a power-supply stopper for stopping supply of power to the amplifier in concert with selecting of the bypass route by the route-selector.

6. The wireless communication circuit as set forth in claim 1 wherein:
    (a) the controller detects a degree of errors in reception data, which is generated from a signal received by the wireless communication circuit, and (b) when the degree of errors does not exceed a threshold value, the controller judges that the communication state is good.

7. The wireless communication circuit as set forth in claim 1 wherein:
    (a) the controller obtains time information from reception data, which is generated from a signal received by the wireless communication circuit, the time information regarding a time at which an application for the reception data is to be executed, (b) the controller compares, with the time information, a time at which the signal is received, and (c) when the controller judges that the reception data of the signal arrived before the time at which the application is to be executed, the controller judges that the communication state is good.

8. The wireless communication circuit as set forth in claim 1, comprising:
a receive buffer for temporarily retaining reception data when reception data generated from a signal received by the wireless communication circuit is streaming data,
the controller receiving information from a communication apparatus that is to transmit the reception data, the information regarding a bit rate of the reception data and a buffer size that is necessary for temporarily retaining the reception data,
the controller obtaining a buffer-full time t from the bit rate and the buffer size, the buffer-full time t being a time necessary for storing the reception data in the receive buffer, the controller comparing the buffer-full time t with a buffering time t', which is an actual time taken to store the reception data in the receive buffer, and
when $t' \leq t$, the controller judges that the communication state is good.

9. The wireless communication circuit as set forth in claim 8, wherein:
when the receive buffer becomes empty during reception of the reception data, the controller judges that the communication state is bad.

10. The wireless communication circuit as set forth in claim 1, wherein:
when reception data generated from a signal received by a wireless communication apparatus, in which the wireless communication circuit is provided, is continuously decoded, the controller judges that the communication state is good,
where the communication apparatus including the wireless communication circuit performs two-way communication with a counterpart communication apparatus.

11. The wireless communication circuit as set forth in claim 1, wherein:
a threshold value is set as to a number of times the controller judges that the communication state is bad, and
while the number of times is less than or equal to the threshold value, the controller judges that the communication state is good.

12. The wireless communication circuit as set forth in claim 1, comprising:
a power-supply stopper for stopping supply of power to the amplifier in concert with selecting of the bypass route by the route-selector.

13. The wireless communication circuit as set forth in claim 1, wherein:
the amplifier includes is a power amplifier for amplifying a signal to be transmitted.

14. The wireless communication circuit as set forth in claim 1 wherein:
the amplifier includes is a low-noise amplifier for amplifying a signal received.

15. The wireless communication circuit as set forth in claim 1 wherein:
the bypass route includes an attenuator for attenuating the signal.

16. The wireless communication circuit as set forth in claim 1 wherein:
the bypass route includes a variable attenuator for attenuating the signal by a variable attenuation amount.

17. A wireless communication circuit including an amplifier for amplifying a signal, the wireless communication circuit comprising:
an amplification route in which the signal passes through the amplifier;
a bypass route for bypassing the amplifier; and
a route-selector for selecting one of the amplification route and the bypass route, the route-selector comprising a controller for judging whether a communication state of the wireless communication circuit is good or bad, and for generating a first control signal that is for selecting one of the amplification route and the bypass route in accordance with a result of the judging,
wherein when an actual reception state of reception data generated from a signal received by the wireless communication circuit, accords with a forecasted reception state of the reception data, the controller judges that the communication state is good, the forecasted reception state being sent from a counterpart communication apparatus before the signal is received.

18. The wireless communication circuit as set forth in claim 17 wherein:
when the controller judges that the communication state is good even if a strength of the signal received is equal to or lower than a predetermined threshold value, the controller generates a first control signal that is for selecting the bypass route.

19. The wireless communication circuit as set forth in claim 18, comprising:
a power-supply stopper for stopping supply of power to the amplifier in concert with selecting of the bypass route by the route-selector.

20. The wireless communication circuit as set forth in claim 17 wherein:
when the controller judges that the communication state is bad even if a strength of the signal received is equal to or higher than a predetermined threshold value, the controller generates a first control signal that is for selecting the amplification route.

21. The wireless communication circuit as set forth in claim 20, comprising:
a power-supply stopper for stopping supply of power to the amplifier in concert with selecting of the bypass route by the route-selector.

22. The wireless communication circuit as set forth in claim 17 wherein:
(a) the controller detects a degree of errors in reception data, which is generated from a signal received by the wireless communication circuit, and (b) when the degree of errors does not exceed a threshold value, the controller judges that the communication state is good.

23. The wireless communication circuit as set forth in claim 17 wherein:
(a) the controller obtains time information from reception data, which is generated from a signal received by the wireless communication circuit, the time information regarding a time at which an application for the reception data is to be executed, (b) the controller compares, with the time information, a time at which the signal is received, and (c) when the controller judges that the reception data of the signal arrived before the time at which the application is to be executed, the controller judges that the communication state is good.

24. The wireless communication circuit as set forth in claim 17, comprising:
a receive buffer for temporarily retaining reception data when reception data generated from a signal received by the wireless communication circuit is streaming data,
the controller receiving information from a communication apparatus that is to transmit the reception data, the information regarding a bit rate of the reception data and a buffer size that is necessary for temporarily retaining the reception data,
the controller obtaining a buffer-full time t from the bit rate and the buffer size, the buffer-full time t being a time necessary for storing the reception data in the receive buffer, the controller comparing the buffer-full time t with a buffering time t', which is an actual time taken to store the reception data in the receive buffer, and
when $t' \leq t$, the controller judges that the communication state is good.

25. The wireless communication circuit as set forth in claim 24, wherein:
when the receive buffer becomes empty during reception of the reception data, the controller judges that the communication state is bad.

26. The wireless communication circuit as set forth in claim 17, wherein:
when reception data generated from a signal received by a wireless communication apparatus, in which the wireless communication circuit is provided, is continuously decoded, the controller judges that the communication state is good,
where the communication apparatus including the wireless communication circuit performs two-way communication with a counterpart communication apparatus.

27. The wireless communication circuit as set forth in claim 17, wherein:
a threshold value is set as to a number of times the controller judges that the communication state is bad, and
while the number of times is less than or equal to the threshold value, the controller judges that the communication state is good.

28. The wireless communication circuit as set forth in claim 17, comprising:
a power-supply stopper for stopping supply of power to the amplifier in concert with selecting of the bypass route by the route-selector.

29. The wireless communication circuit as set forth in claim 17, wherein:
the amplifier includes a power amplifier for amplifying a signal to be transmitted.

30. The wireless communication circuit as set forth in claim 17 wherein:
the amplifier includes a low-noise amplifier for amplifying a signal received.

31. The wireless communication circuit as set forth in claim 17 wherein:
the bypass route includes an attenuator for attenuating the signal.

32. The wireless communication circuit as set forth in claim 17 wherein:
the bypass route includes variable attenuator for attenuating the signal by a variable attenuation amount.

33. A wireless communication circuit including an amplifier for amplifying a signal, the wireless communication circuit comprising:
an amplification route in which the signal passes through the amplifier;
a bypass route for bypassing the amplifier; and
a route-selector for selecting one of the amplification route and the bypass route, the route-selector comprising a controller for judging whether a communication state of the wireless communication circuit is good or bad, and for generating a first control signal that is for selecting one of the amplification route and the bypass route in accordance with a result of the judging,
wherein when an error-resilience tool that interpolates or corrects data having errors is not operated, the controller judges that the communication state is good, the error-resilience tool being provided in an application using reception data, which is generated from a signal received by the wireless communication circuit.

34. The wireless communication circuit as set forth in claim 33 wherein:
when the controller judges that the communication state is good even if a strength of the signal received is equal to or lower than a predetermined threshold value, the controller generates a first control signal that is for selecting the bypass route.

35. The wireless communication circuit as set forth in claim 34, comprising:
a power-supply stopper for stopping supply of power to the amplifier in concert with selecting of the bypass route by the route-selector.

36. The wireless communication circuit as set forth in claim 33 wherein:
when the controller judges that the communication state is bad even if a strength of the signal received is equal to or higher than a predetermined threshold value, the controller generates a first control signal that is for selecting the amplification route.

37. The wireless communication circuit as set forth in claim 36, comprising:
a power-supply stopper for stopping supply of power to the amplifier in concert with selecting of the bypass route by the route-selector.

38. The wireless communication circuit as set forth in claim 33 wherein:
(a) the controller detects a degree of errors in reception data, which is generated from a signal received by the wireless communication circuit, and (b) when the degree of errors does not exceed a threshold value, the controller judges that the communication state is good.

39. The wireless communication circuit as set forth in claim 33 wherein:
(a) the controller obtains a time information from reception data, which is generated from a signal received by the wireless communication circuit, the time information regarding a time at which an application for the reception data is to be executed, (b) the controller compares, with the time information, a time at which the signal is received, and (c) when the controller judges that the reception data of the signal arrived before the time at which the application is to be executed, the controller judges that the communication state is good.

40. The wireless communication circuit as set forth in claim 33, comprising:
a receive buffer for temporarily retaining reception data when reception data generated from a signal received by the wireless communication circuit is streaming data, the controller receiving information from a communication apparatus that is to transmit the reception data, the information regarding a bit rate of the reception data and a buffer size that is necessary for temporarily retaining the reception data, the controller obtaining a buffer-full time t from the bit rate and the buffer size, the buffer-full time t being a time necessary for storing the reception data in the receive buffer, the controller comparing the buffer-full time t with a buffering time t', which is an actual time taken to store the reception data in the receive buffer, and when $t' \leq t$, the controller judges that the communication state is good.

41. The wireless communication circuit as set forth in claim 40, wherein:

when the receive buffer becomes empty during reception of the reception data, the controller judges that the communication state is bad.

42. The wireless communication circuit as set forth in claim 33, wherein:

when reception data generated from a signal received by a wireless communication apparatus, in which the wireless communication circuit is provided, is continuously decoded, the controller judges that the communication state is good, where the communication apparatus including the wireless communication circuit performs two-way communication with a counterpart communication apparatus.

43. The wireless communication circuit as set forth in claim 33, wherein:

a threshold value is set as to a number of times the controller judges that the communication state is bad, and while the number of times is less than or equal to the threshold value, the controller judges that the communication state is good.

44. The wireless communication circuit as set forth in claim 33, comprising:

a power-supply stopper for stopping supply of power to the amplifier in concert with selecting of the bypass route by the route-selector.

45. The wireless communication circuit as set forth in claim 33, wherein:

the amplifier includes a power amplifier for amplifying a signal to be transmitted.

46. The wireless communication circuit as set forth in claim 33 wherein:

the amplifier includes a low-noise amplifier for amplifying a signal received.

47. The wireless communication circuit as set forth in claim 33 wherein:

the bypass route includes an attenuator for attenuating the signal.

48. The wireless communication circuit as set forth in claim 33 wherein:

the bypass route includes a variable attenuator for attenuating the signal by a variable attenuation amount.

49. A wireless communication apparatus comprising:

a wireless communication circuit including an amplifier for amplifying a signal, the wireless communication circuit comprising:

an amplification route in which the signal passes through the amplifier;

a bypass route for bypassing the amplifier; and a route-selector for selecting one of the amplification route and the bypass route, the route-selector comprising a controller for judging whether a communication state of the wireless communication circuit is good or bad, and for generating a first control signal that is for selecting one of the amplification route and the bypass route in accordance with a result of the judging, wherein when the wireless communication circuit receives no retransmission request from a counterpart communication apparatus to which the wireless communication circuit sent an information signal, the controller judges that the communication state is good.

50. A wireless communication system including a wireless communication apparatus, wherein:

the wireless communication apparatus comprising:

a wireless communication circuit including an amplifier for amplifying a signal, the wireless communication circuit comprising:

an amplification route in which the signal passes through the amplifier;

a bypass route for bypassing the amplifier; and a route-selector for selecting one of the amplification route and the bypass route, the route-selector comprising a controller for judging whether a communication state of the wireless communication circuit is good or bad, and for generating a first control signal that is for selecting one of the amplification route and the bypass route in accordance with a result of the judging, wherein when the wireless communication circuit receives no retransmission request from a counterpart communication apparatus to which the wireless communication circuit sent an information signal, the controller judges that the communication state is good.

51. A wireless communication apparatus comprising:

a wireless communication circuit including an amplifier for amplifying a signal, the wireless communication circuit comprising:

an amplification route in which the signal passes through the amplifier;

a bypass route for bypassing the amplifier; and a route-selector for selecting one of the amplification route and the bypass route, the route-selector comprising a controller for judging whether a communication state of the wireless communication circuit is good or bad, and for generating a first control signal that is for selecting one of the amplification route and the bypass route in accordance with a result of the judging, wherein when an actual reception state of reception data generated from a signal received by the wireless communication circuit, accords with a forecasted reception state of the reception data, the controller judges that the communication state is good, the forecasted reception state being notified from a counterpart communication apparatus before the signal is received.

52. A wireless communication system including a wireless communication apparatus, wherein:

the wireless communication apparatus comprising:

a wireless communication circuit including an amplifier for amplifying a signal, the wireless communication circuit comprising:

an amplification route in which the signal passes through the amplifier;

a bypass route for bypassing the amplifier; and a route-selector for selecting one of the amplification route and the bypass route, the route-selector comprising a controller for judging whether a communication state of the wireless communication circuit is good or bad, and for generating a first control signal that is for selecting one of the amplification route and the bypass route in accordance with a result of the judging, wherein when an actual reception state of reception data generated from a signal received by the wireless communication circuit, accords with a forecasted reception state of the reception data, the controller judges that the communication state is good, the forecasted reception state being notified from a counterpart communication apparatus before the signal is received.

53. A wireless communication apparatus comprising:
a wireless communication circuit including an amplifier for amplifying a signal, the wireless communication circuit comprising:
    an amplification route in which the signal passes through the amplifier;
    a bypass route for bypassing the amplifier; and
    a route-selector for selecting one of the amplification route and the bypass route, the route-selector comprising a controller for judging whether a communication state of the wireless communication circuit is good or bad, and for generating a first control signal that is for selecting one of the amplification route and the bypass route in accordance with a result of the judging,
    wherein when an error-resilience tool that interpolates or corrects data having errors is not operated, the controller judges that the communication state is good, the error-resilience tool provided in an application using reception data, which is generated from a signal received by the wireless communication circuit.

54. A wireless communication system including a wireless communication apparatus, wherein:
the wireless communication apparatus comprising:
a wireless communication circuit including an amplifier for amplifying a signal, the wireless communication circuit comprising:
    an amplification route in which the signal passes through the amplifier;
    a bypass route for bypassing the amplifier; and
    a route-selector for selecting one of the amplification route and the bypass route, the route-selector comprising a controller for judging whether a communication state of the wireless communication circuit is good or bad, and for generating a first control signal that is for selecting one of the amplification route and the bypass route in accordance with a result of the judging,
    wherein when an error-resilience tool that interpolates or corrects data having errors is not operated, the controller judges that the communication state is good, the error-resilience tool provided in an application using reception data, which is generated from a signal received by the wireless communication circuit.

* * * * *